United States Patent
Karlsson et al.

(10) Patent No.: US 9,543,847 B2
(45) Date of Patent: Jan. 10, 2017

(54) SWITCHED MODE POWER SUPPLY WITH IMPROVED LIGHT LOAD EFFICIENCY

(75) Inventors: Magnus Karlsson, Oskarshamn (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/413,749

(22) PCT Filed: Jul. 13, 2012

(86) PCT No.: PCT/EP2012/063817
§ 371 (c)(1),
(2), (4) Date: Jan. 9, 2015

(87) PCT Pub. No.: WO2014/008948
PCT Pub. Date: Jan. 16, 2014

(65) Prior Publication Data
US 2015/0138844 A1     May 21, 2015

(51) Int. Cl.
*H02M 3/335* (2006.01)
*H02M 3/158* (2006.01)
(Continued)

(52) U.S. Cl.
CPC ......... *H02M 3/33546* (2013.01); *H02M 3/157* (2013.01); *H02M 3/158* (2013.01);
(Continued)

(58) Field of Classification Search
CPC .................................................... H02M 3/335
(Continued)

(56) References Cited

U.S. PATENT DOCUMENTS 6,366,070 B1 *  4/2002  Cooke ..................... G05F 1/44
                                                    323/284
6,396,252 B1    5/2002  Culpepper
(Continued)

FOREIGN PATENT DOCUMENTS

EP         0942518 A2     9/1999
WO       2012028189 A1    3/2012

OTHER PUBLICATIONS

Visairo-Cruz, H, et al., "Dual Voltage Input Reconfigurable VR for Improving Light-Load Efficiency," 6th International Caribbean Conference on Devices, Circuits and Systems, IEEE, Piscataway, NJ, USA, Apr. 26-28, 2006, pp. 237-242.
(Continued)

*Primary Examiner* — Matthew Nguyen
*Assistant Examiner* — Trinh Dang

(57) ABSTRACT

A control circuit operable to control the switching of switching elements in a switched mode power supply. The control circuit comprises a switching control signal generator operable to generate control signals for switching the switching elements such that the switched mode power supply converts an input voltage ($V_{in}$) to an output voltage $V_{out}$). The control circuit further comprises an operation mode setting module which is operable to receive a signal (I) indicative of a current flowing to a load that is connected to an output of the switched mode power supply, and operable to cause the switching control signal generator to generate the control signals so as to operate the switched mode power supply in a continuous conduction mode or a pulse skipping mode in dependence upon the current.

25 Claims, 18 Drawing Sheets

(51) Int. Cl.
*H02M 3/157* (2006.01)
*H02M 3/337* (2006.01)
H02M 1/00 (2006.01)

(52) U.S. Cl.
CPC ......... *H02M 3/335* (2013.01); *H02M 3/3376* (2013.01); *H02M 3/33592* (2013.01); H02M 2001/0032 (2013.01); Y02B 70/1475 (2013.01); Y02B 70/16 (2013.01)

(58) Field of Classification Search
USPC ............... 323/284, 285; 363/21.04–21.11
See application file for complete search history.

(56) References Cited

U.S. PATENT DOCUMENTS

| | | | |
|---|---|---|---|
| 7,075,280 B2 | 7/2006 | May | |
| 7,906,949 B1 | 3/2011 | Sutardja | |
| 2006/0268974 A1 | 11/2006 | Chu | |
| 2009/0028273 A1* | 1/2009 | Lin | H04L 25/4902 375/324 |
| 2010/0172157 A1* | 7/2010 | Chen | H02M 3/33592 363/21.02 |
| 2010/0194372 A1* | 8/2010 | Yen | H02M 3/156 323/311 |
| 2011/0062926 A1* | 3/2011 | Qiu | H02M 3/1588 323/282 |
| 2012/0287681 A1* | 11/2012 | Wahledow | H02M 1/38 363/21.04 |

OTHER PUBLICATIONS

Xu, Zhang, et al., "Digital PWM/PFM controller with input voltage feed-forward for synchronous buck converters," Applied Power Electronics Conference and Exposition, 23rd Annual IEEE, APEC 2008, Piscataway, NJ, USA, Feb. 24, 2008, pp. 523-528.
Sebastien Cliquennois, et al., "A 65-nm, I-A Buck Converter with Multi-Function SAR-ADC-Based CCM/PSK Digital Control Loop," IEEE Journal of Solid-State Circuits, IEEE Service Center, Piscataway, NJ, USA, vol. 47, No. 7, Jul. 1, 2012, pp. 1546-1556.
Erickson, Robert W., "The Discontinuous Conduction Mode," Fundamentals of Power Electronics, 2nd Edition, Secaucus, NJ, USA, Kluwer Academic Publishers, 2000.
Pithadia, Sanjay and Jeff Falin, "Understanding TPS61175's Pulse-Skipping Function," Application Report, SLVA353, Texas Instruments, Dallas, TX, USA, Jul. 2009.

* cited by examiner

SWITCHED MODE POWER SUPPLY WITH IMPROVED LIGHT LOAD EFFICIENCY

This application is a 371, and claims benefit, of International Application PCT/EP2012/063817, filed Jul. 13, 2012, the disclosure of which is fully incorporated herein by reference.

TECHNICAL FIELD

The present invention generally relates to the field of switched mode power supplies (sometimes referred to as switch mode power supplies or switching mode power supplies) and more specifically to a scheme of controlling switching elements in a switched mode power supply that improves efficiency of the switched mode power supply when operating under light load.

BACKGROUND

The switched mode power supply (SMPS) is a well-known type of power converter having a diverse range of applications by virtue of its small size and weight, and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching defining the efficiency with which an input voltage is converted to a desired output voltage. Switched mode power supplies have for many years been designed for highpower efficiency in the load range of 50 to 100%. This has led to the adoption of techniques such as synchronous rectification, which yield high efficiency at higher current levels.

FIG. 1 shows a background example of a known hard-switched, isolated SMPS, i.e. an SMPS which converts an input voltage $V_{in}$ to an output voltage $V_{out}$ whilst isolating the input from the output through an isolation transformer. The SMPS 100 is provided in the form of a full-bridge (DC-to-DC) converter which has on its primary side a primary side drive circuit having transistors Q1, Q2, Q3 and Q4 (which may, for example, be field-effect transistors such as MOSFETs or IGBTs) which are connected between the power supply's inputs and to the primary winding 111 of the isolation transformer 110 in a full-bridge arrangement, as shown. The transistors Q1-Q4 are thus configured to drive the primary winding 111 in response to switching control signals applied thereto.

The switching of the transistors is controlled by a switching control circuit comprising a switch driving circuit 120, a pulse width modulation (PWM) controller, and an error signal generator 140. The driving circuit 120 and PWM controller 130 together function as a switching control signal generator. More specifically, the driving circuit 120 generates respective drive pulses to be applied to the gates of transistors Q1-Q4 in order to turn the transistors ON or OFF, the drive pulses being generated in accordance with switching control signals provided to the drive circuit 120 by the PWM controller 130. In turn, the PWM controller 130 is arranged to receive an error signal generated by the error signal generator 140. The error signal provides a measure of the difference between the output of the SMPS 100 (here, the output voltage $V_{out}$) and a reference for the output, which is a reference voltage $V_{ref}$ in the present example. In the present example, the error signal from the error signal generator 140 passes through an electrical isolation barrier 150 (e.g. one or more opto-electric converters) provided between the primary and secondary side circuits of the SMPS 100.

FIG. 1 also shows a standard topology on the secondary side of the isolated SMPS 100, which includes a rectifying circuit and an LC filter connected to a load 160. The inductor 170 of the LC filter is connected to the secondary winding 112 of the transformer 110. A centre-tap (or "mid-tap") 113 is provided in the secondary winding 112. In the present example, the rectifying network in the secondary side circuit employs two transistors, Q5 and Q6, to yield full-wave rectification of the voltage induced in the secondary winding 112. Each of the switching devices Q5 and Q6 can take any suitable or desirable form, and are preferably field-effect transistors in the form of a MOSFET or an IGBT, for example. The switching of these transistors is controlled by the same switching control signal generator that controls the switching of transistors Q1-Q4, namely that comprising the drive circuit 120 and the PWM controller 130. The portion of the SMPS 100 circuit identified at 180 in FIG. 1 constitutes the so-called "power train" of the SMPS 100.

As with most SMPS topologies, the output voltage $V_{out}$ in this example is proportional to the input voltage $V_{in}$. More specifically, $V_{out} \propto nDV_{in}$, where D is the switching duty cycle ratio and n is the transformer turns ratio.

The timings according to which the transistors Q1-Q6 of the SMPS 100 of FIG. 1 are switched are illustrated by timing diagrams A-D of FIG. 2 for the case where the SMPS 100 operates with a relatively large duty cycle of about 85%. Switching the transistors Q1-Q6 in accordance with timing diagrams A-D causes the SMPS 100 to operate in the well-known "Continuous Conduction Mode" (CCM), with the current $I_L$ through the inductor 170 oscillating in the manner shown in trace E of FIG. 2 while remaining greater than zero throughout each switching period $T_s$. As can be appreciated from timing diagrams C and D, when the SMPS 100 operates in CCM, at least one of the transistors in the secondary side circuit is configured to be in a conductive state (i.e. turned ON) at any given point in time. In other words, during operation in CCM, at no stage of the SMPS switching cycle is the conduction path for the inductor current $I_L$ blocked by all of the transistors in the secondary side circuit.

The amplitude of the oscillation in the inductor current, $I_{ripple}/2$ (shown in trace E of FIG. 2) is a function of the input voltage $V_{in}$ to the SMPS 100, the switching duty cycle D, the switching period $T_s$ employed by the switching controller 130, and the inductance L of the inductor 170. Accordingly, when the SMPS 100 is operated with a lower duty cycle, as illustrated by timing diagrams A-D of FIG. 3, the amplitude of the ripple current is reduced, as shown in trace E of FIG. 3.

However, the size of the ripple current is not dependent on the SMPS load resistance R and will therefore not change when the load resistance R increases and the output current $I_{out}$ of the SMPS consequently decreases. Thus, when the value of R increases while the remaining operational parameters of the SMPS 100 (such as D and $T_s$) stay unchanged, the dc component, $I_{Ldc}$, of the inductor current $I_L$ will eventually decrease to below $I_{ripple}/2$, and the inductor current $I_L$ will become negative during a portion of each switching period, as illustrated in trace F of FIG. 3.

At such low output current levels, an SMPS employing synchronous rectification on the secondary side in accordance with the switching scheme shown in FIG. 3 will usually be less efficient than a similar SMPS that employs diode rectification on the secondary side. In order to improve the light load efficiency, it is therefore known to use diode emulation to cause the synchronous secondary side circuit to mimic diode rectification. In this case, transistors Q5 and Q6 are controlled to behave like current-unidirectional switches (such as diodes) that conduct current only when the inductor current $I_L$ is above a threshold.

Examples of switch timing diagrams which may be used to emulate diode rectification on the secondary side of the SMPS 100 are shown in FIG. 4. Although the timing diagrams for transistors pairs Q1/Q4 and Q2/Q3 on the primary side are the same as those in diagrams A and B in FIG. 3, the timings for the secondary side transistors Q5 and Q6 are adjusted such that the inductor current $I_L$ is not allowed to fall below zero at any stage of the switching cycle. In this way, transistors Q5 and Q6 are controlled to behave like diodes, which become reverse biased and thus block current flow when the inductor current $I_L$ falls to zero. The inductor current $I_L$ is thus held at zero for a portion of each switching cycle, as shown in trace E of FIG. 4, and the SMPS 100 operates in the well-known "Discontinuous Conduction Mode" (DCM). In the DCM, while the inductor current $I_L$ is zero, energy is supplied to the SMPS load circuit by the filter capacitor 190. However, diode emulation leads to certain problems with the compensator design, which will now be discussed.

When operating an SMPS in a diode emulation mode, the current in the inductor 170 becomes discontinuous when the dc component of the inductor current falls below $I_{ripple}/2$. This makes the duty cycle D dependent on the current, as explained insection 5.1 in Chapter 5 of "Fundamentals of Power Electronics" by R. W. Erickson and D. Maksimović (Second Edition, ISBN: 0-7923-7270-0). In brief, it can be shown from a consideration of the inductor volt-second balance and capacitor charge balance that the output voltage $V_{out}$ of the SMPS 100 takes the following forms in CCM and DCM:

$$V_{out} = \begin{cases} nDV_{in} & K > K_{crit} \text{ i.e. CCM} \\ \dfrac{2nV_{in}}{1+\sqrt{1+4K/D^2}} & K < K_{crit} \text{ i.e. DCM} \end{cases} \quad \text{Equation 1}$$

In Eqn. 1, the dimensionless parameter $K=2L/RT_s$ and $K_{crit}=1-D$. In order to keep the output voltage $V_{out}$ constant in DCM, the factor $K/D^2$ must be held constant. Solving for the duty cycle we obtain:

$$D \propto \frac{1}{\sqrt{R}} \propto \sqrt{I_0} \quad \text{Equation 2}$$

Hence, with decreasing load current, i.e. increasing value of R, the duty cycle D is required to decrease. This means that the duty cycle D has to change by a large amount when SMPS operation changes between CCM and DCM. In other words, the gain in the system varies strongly with the load current and this requires substantial changes to the duty cycle D to be made as the load current changes.

In conventional SMPS controllers, a gain scheduling approach is usually adopted and different compensators are provided for the different working regions, which increases the complexity of the controller. Moreover, as will be demonstrated by way of experimental results in the following, the large changes to the duty cycle D that are required as the SMPS 100 transitions between operating in CCM and DCM cause large transients to appear in the output voltage of the SMPS 100. It is therefore highly desirable to maximise light load efficiency of an SMPS whilst improving its output transient performance.

SUMMARY

In view of the problems in known SMPS control strategies, the present invention aims to improve the light load efficiency of an SMPS whilst at the same time improving its output voltage transient performance.

This is achieved in an embodiment of the present invention by controlling the switching control signal generator of the SMPS to operate the SMPS in CCM when a monitored signal, which is indicative of a current flowing to a load that is connected to an output of the SMPS (for example, the SMPS output current or the current flowing through an inductor that forms part of an output filter of the SMPS) indicates that the current is above a threshold, and to change the operation of the SMPS from CCM to a pulse skipping mode (PSM) directly (i.e. without entering the discontinuous conduction mode or other operational mode) when the current is determined to have fallen to or below the threshold. In the pulse skipping mode, the SMPS continues to supply power to the load but one or more of the switching pulses that would normally be applied to the switching elements during CCM operation are skipped by switching the switching elements OFF for at least one switching period.

As will be explained in the following, this control scheme avoids the large duty cycle change that has heretofore been required when leaving the CCM mode and allows efficient SMPS operation at light load levels to be preserved whilst improving the output transient response as compared to the conventional control scheme, wherein the SMPS transitions from operating in CCM to operating in DCM.

More specifically, the present invention provides a control circuit operable to control the switching of switching elements in an SMPS. The control circuit comprises a switching control signal generator operable to generate control signals for switching the switching elements such that the SMPS converts an input voltage to an output voltage. The control circuit further comprises an operation mode setting module operable to receive a signal indicative of a current flowing to a load that is connected to an output of the SMPS, and operable to cause the switching control signal generator to generate the control signals so as to operate the SMPS in a continuous conduction mode or a pulse skipping mode in dependence upon the current. In the pulse skipping mode, the switching elements are turned OFF for at least one switching period of the SMPS but the SMPS continues to supply power to the load. The operation mode setting module is operable to monitor the signal indicative of the current to determine whether the current exceeds a threshold, and is operable to control the switching control signal generator to generate the control signals such that, when the current exceeds the threshold, the SMPS operates in the continuous conduction mode and, upon determining that the current has fallen to or below the threshold, operation of the SMPS is changed from the continuous conduction mode to the pulse skipping mode so that the pulse skipping mode is entered from the continuous conduction mode.

The present invention also provides an SMPS having a control circuit as set out above.

The present invention further provides a method of controlling a switching control signal generator of an SMPS to generate control signals for controlling the switching of switching elements in the SMPS so as to convert an input voltage to an output voltage. The method comprises monitoring a signal indicative of an current flowing to a load that is connected to an output of the SMPS to determine whether the current exceeds a threshold. The switching control signal generator is controlled to generate control signals for the switching elements so as to operate the SMPS in a continuous conduction mode when the current is determined to exceed the threshold. Upon determining that the current has fallen to or below the threshold, the switching control signal generator is controlled to generate control signals for the switching elements so as to change the operation of the SMPS from the continuous conduction mode to a pulse skipping mode, wherein the switching elements are turned OFF for at least one switching period of the SMPS but the SMPS continues to supply power to the load, such that the pulse skipping mode is entered from the continuous conduction mode.

The present invention further provides a computer program product, comprising a computer-readable storage medium or a signal, carrying computer program instructions which, when executed by a processor, cause the processor to perform a method as set out above.

BRIEF DESCRIPTION OF THE DRAWINGS

Embodiments of the invention will now be described, by way of example only, with reference to the accompanying drawings in which.

DETAILED DESCRIPTION OF EMBODIMENTS

First Embodiment

Figure 1:
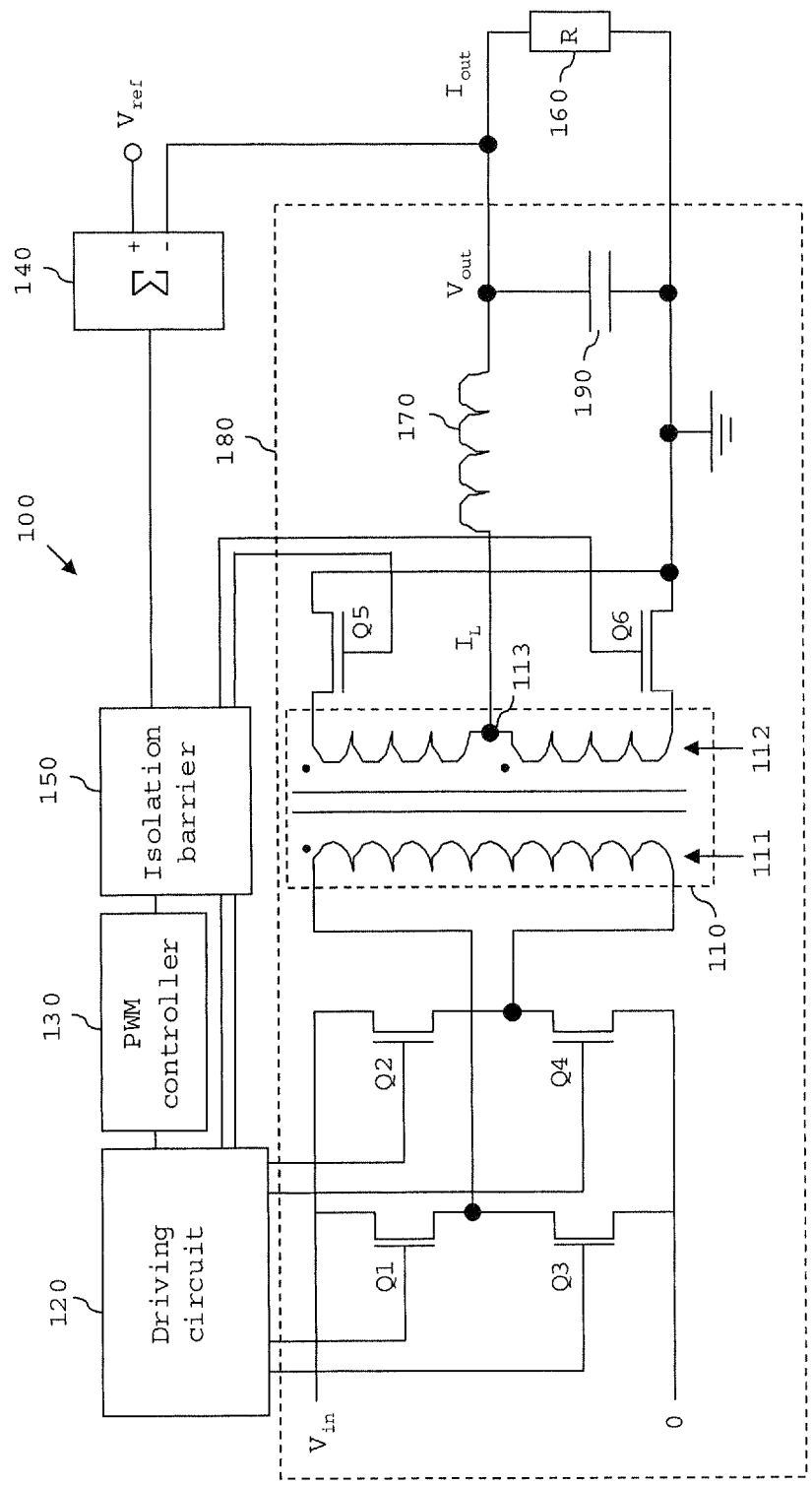
FIG. 1 illustrates key components of a conventional SMPS.
Figure 5:
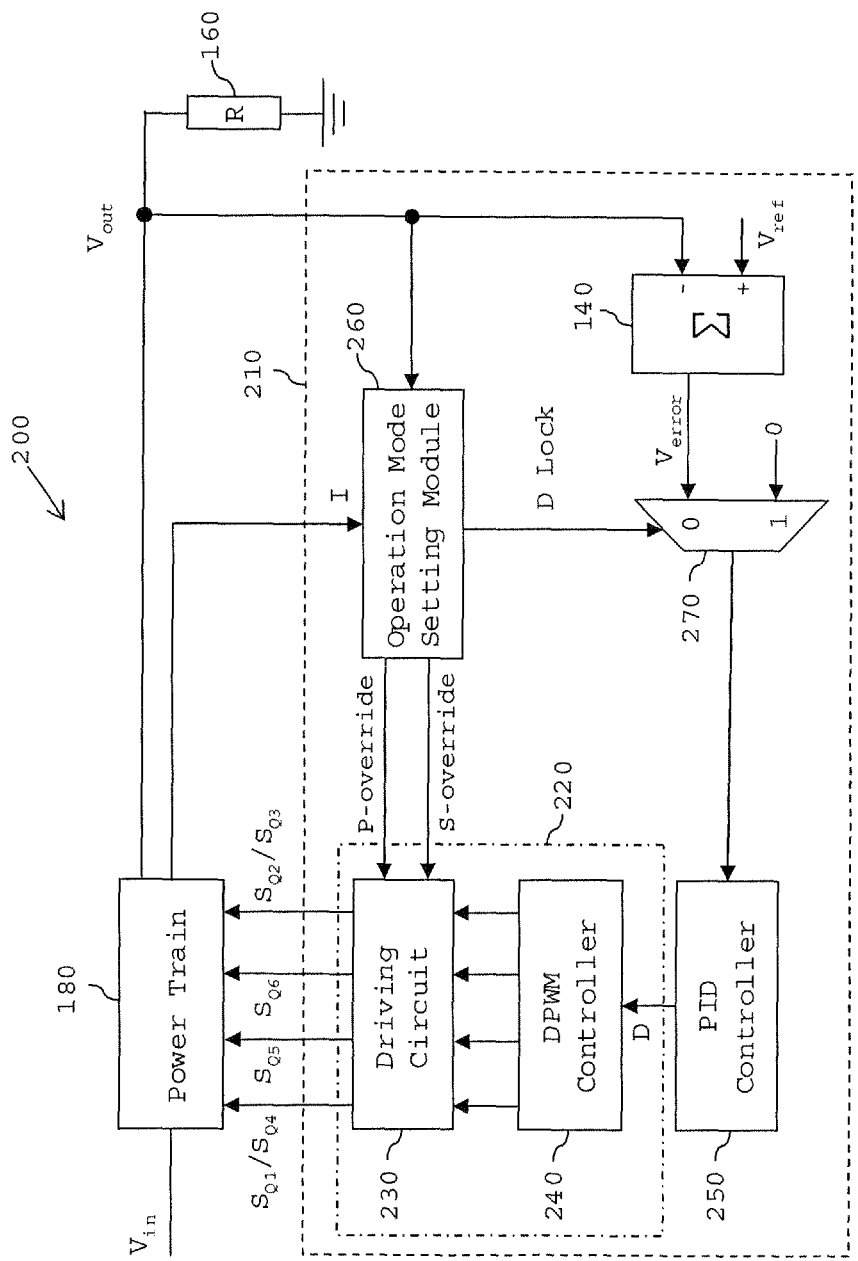
FIG. 5 shows an SMPS according to an embodiment of the present invention.

FIG. 5 shows an SMPS 200 according to a first embodiment of the present invention. In this embodiment, the SMPS 200 comprises a power train 180 as shown in FIG. 1, and a control circuit 210 for controlling the switching of the transistors Q1-Q6 in the power train 180. The control circuit 210 includes a switching control signal generator 220, which comprises a transistor driving circuit 230 and a digital PWM controller 240 for controlling the switch timings according to which the driving circuit 230 switches transistors Q1-Q6 in the power train 180 via control signals $S_{Q1}$ to $S_{Q6}$. It should be noted that the power train 180 of FIG. 1 is given by way of example only, and the SMPS control techniques described herein are not limited to this power train topology but can be used for all SMPS power trains, whether isolated or non-isolated.

In order to regulate output voltage $V_{out}$ of the SMPS 200, the control circuit 210 comprises a control loop comprising an error signal generator 140 (which is the same as in the example of FIG. 1) and a regulator, which in the present embodiment takes the form of a PID controller 250 (also referred to herein as a PID regulator). Although the control circuit 210 of the present embodiment employs a PID controller, a PI controller may alternatively be used. The distribution of the components of the control circuit 210 among the primary and secondary sides of the SMPS isolation barrier is not shown in FIG. 5 for reasons of clarity.

In the present embodiment, the error signal generator 140 is provided on the secondary side and the remaining components on the primary side, although an alternative arrangement may be adopted.

The error signal generator 140 is operable to receive a signal indicative of the output voltage $V_{out}$, which in this embodiment is equal to the output voltage $V_{out}$. The error signal generator 140 is further operable to generate an error signal $V_{error}$ based on the output voltage $V_{out}$ and a reference signal $V_{ref}$ generated by a reference voltage generator (not shown), specifically by subtracting one of the output voltage $V_{out}$ and the reference voltage $V_{ref}$ from the other of the output voltage $V_{out}$ and the reference voltage $V_{ref}$.

The PID controller 250 is operable to generate, in dependence upon the error signal $V_{error}$, a signal defining the duty cycle D that is to be used by the DPWM controller 240 to set the switch timings for transistors Q1-Q6 such that the SMPS 200 converts the input voltage $V_{in}$ to a, output voltage $V_{out}$ whose size is set by a user. Practical implementations of the error signal generator 140, DPWM controller 240 and PID controller 250, and the operation thereof to regulate the output voltage $V_{out}$ of the SMPS 200 at relatively high load current levels, will be familiar to those skilled in the art and will therefore not be described further.

In order to achieve high efficiency during light load operation and improved output transient response while transitioning to/from light load operation, the SMPS 200 is provided with an operation mode setting module 260, whose functionality will be described in detail below. However, it suffices to say at this stage that the operation mode setting module 260 is arranged to monitor a signal I indicative of a current flowing to a load 160 connected to an output of the SMPS 200, and cause the SMPS 200 to transition from operating in the continuous conduction mode directly to a pulse skipping mode (PSM) upon determining that the current has fallen to or below a threshold. Operation in the pulse skipping mode under this light current load condition yields high efficiency, and the transitions between operation in PSM and CCM are accompanied by significantly less pronounced output voltage transients than are typically observed during the conventional transitions between CCM and DCM.

In the present embodiment, the signal I received by the operation mode setting module 260 is indicative of the current $I_L$ flowing through the inductor 170 of the SMPS output filter (shown in FIG. 1), which may be measured using any suitable technique, for example by using an RC filter in parallel with the inductor 170. However, the operation mode setting module 260 may alternatively be configured to receive a signal that is indicative of the SMPS output current $I_{out}$, such as the voltage across a shunt that is provided at the output of the SMPS 200.

As shown in FIG. 5, the operation mode setting module 260 is also arranged to receive a signal indicative of the output voltage $V_{out}$ of the SMPS 200. The operation mode setting module 260 is configured to generate control signals for the driving circuit 230 on the basis of these received signals, in the manner which is described in detail below.

The control circuit 210 of the present embodiment further comprises an error signal zeroing module 270 for setting the error signal $V_{error}$ to zero. Since the steady state duty cycle value to be used by the DPWM controller 240 is stored in the integral part of the PID controller 250, zeroing the voltage error from the error signal generator 140 will have the effect of keeping the integral parameter of the PID controller 250 constant and thus prevent the duty cycle value from changing. As will be explained below, the operation mode setting module 260 is preferably configured to lock the duty cycle D when it causes the SMPS 200 to change from operating in CCM to operating in PSM upon detecting that the monitored current has fallen to or below a threshold such that a more efficient mode of light load operation is required. Preserving the value of the duty cycle in the PID controller 250 in this way has the advantage of allowing the SMPS 200 to resume operation in the continuous conduction mode after it has operated in the pulse skipping mode without performing the time-consuming voltage regulation process that would otherwise be required. This yields a fast and relatively noise-free transition back to CCM once the monitored current has increased above the threshold.

In the present embodiment, the error signal zeroing module 270 is arranged to receive the error signal $V_{error}$ from the error signal generator 140 and an instructing signal "D Lock" from the operation mode setting module 260 and, in accordance with the instructing signal, either output an error signal indicating that there is no difference between the reference signal $V_{ref}$ and $V_{out}$, or relay the received error signal $V_{error}$ to the PID controller 250 unchanged. More specifically, in the present embodiment, the error signal zeroing module 270 is provided in the form of a multiplexer which receives the error signal $V_{error}$ at one of its inputs and a null (zero) signal at another of its inputs and, in accordance with the instructing signal from the operation mode setting module 260, transmits either the error signal $V_{error}$ or the zero signal to the PID controller 250.

In an alternative embodiment, the error signal zeroing module 270 may be provided in the form of a multiplier, which multiplies the received error signal $V_{error}$ by either "1" or "0", depending on the instructing signal from the operation mode setting module 260.

As a further alternative, the error signal zeroing module 270 may cause the error signal generator 140 to generate a zero error signal itself, so example by the operation mode setting module 260 being provided at the inverting input of the error signal generator 140 (as part of the error signal generator 140) and configured to select, in dependence on the instructing signal from the operation mode setting module 260, either the received signal that is indicative of the output voltage $V_{out}$ or the reference signal $V_{ref}$ for processing by the error signal generator 140. In this way, when the error signal zeroing module 270 selects the reference signal $V_{ref}$, the error signal generator 140 generates an error signal indicating that there is no difference between the signals at its inputs.

Among these alternative ways of setting the error signal to zero, the schemes employed in the present embodiment and in the above-mentioned alternative embodiment are preferred as the locked value of the duty cycle in these cases is more stable with time.

As yet another way of locking the duty cycle, the value of the currently set duty cycle may be saved in a memory when the operation mode setting module 260 causes the SMPS 200 to change from operating in CCM to operating in PSM. When the SMPS 200 subsequently reverts to operating in CCM, the stored value of the duty cycle may be retrieved from memory for use by the DPWM controller 240.

In addition to providing the "D Lock" instructing signal to the error signal zeroing module 270, the operation mode setting module 260 is further operable to provide the driving circuit 230 with instructing signals "P-override" for enabling and determining the operation of transistors Q1-Q4 in the primary side circuit of the power train 180, and instructing signals "S-override" for enabling and determining the operation of transistors Q5 and Q6 in the secondary side circuit of the power train 180. As will be explained in the following, these instructing signals, which are generated by the operation mode setting module 260 in dependence upon the signals I and $V_{out}$ received thereby, cause the switching control signal generator 220 to operate the SMPS 200 in a continuous conduction mode, a pulse skipping mode or a discontinuous conduction mode.

Figure 6:
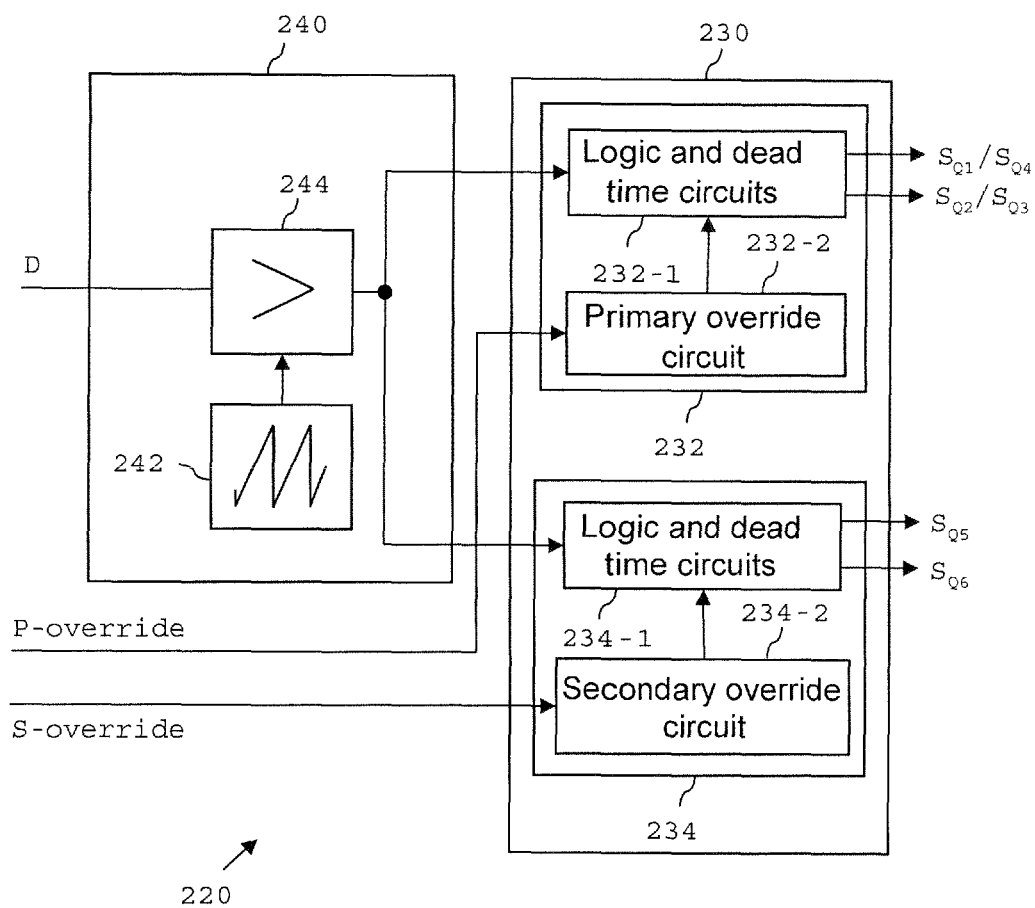
FIG. 6 shows details of the DPWM controller and driving circuit of the SMPS shown in FIG. 5.

Details of the switching control signal generator 220 of the present embodiment are shown in FIG. 6. The DPWM controller 240 of the switching control signal generator 220 comprises a saw tooth signal generator 242 for generating a saw tooth signal, and a comparator 244 for generating a PWM signal from a comparison of the received signal with the saw tooth signal from the saw tooth signal generator 242 in the conventional way, when the SMPS 200 is operating in the continuous conduction mode.

The driving circuit 230 comprises a primary side driving circuit 232 having logic and dead time circuits 232-1, and a secondary side driving circuit 234 having logic and dead time circuits 234-1. The logic and dead time circuits 232-1 and 234-1 generate transistor driving signals $S_{Q1}/S_{Q4}$ and $S_{Q2}/S_{Q3}$ for primary side transistors Q1-Q4, and driving signals $S_{Q5}$ and $S_{Q6}$ for secondary side transistors Q5 and Q6, respectively, in accordance with the PWM signals generated by the DPWM controller 240 when the driving circuit 230 is being controlled by the DPWM controller 240. However, the PWM signals supplied to the primary side logic and dead time circuits 232-1 by the DPWM controller 240 can be overridden by the primary override circuit 232-2, in accordance with a primary override signal, "P-override", which is generated by the operation mode setting module 260 under the conditions described below. Similarly, the PWM signals supplied to the secondary side logic and dead time circuits 234-1 by the DPWM controller 240 can be overridden by the secondary override circuit 234-2, in accordance with a secondary override signal, "S-override", which is generated by the operation mode setting module 260 under the conditions described below. When the PWM signal from the DPWM controller 240 is overridden, the logic and dead time circuits 232-1 and 234-1 may stop generating switching signals for transistors Q1-Q6 altogether, as in the present embodiment, or they may alternatively generate control signals in accordance with switch timings that are determined by the operation mode setting module 260, as in the third embodiment described below.

Figure 7:
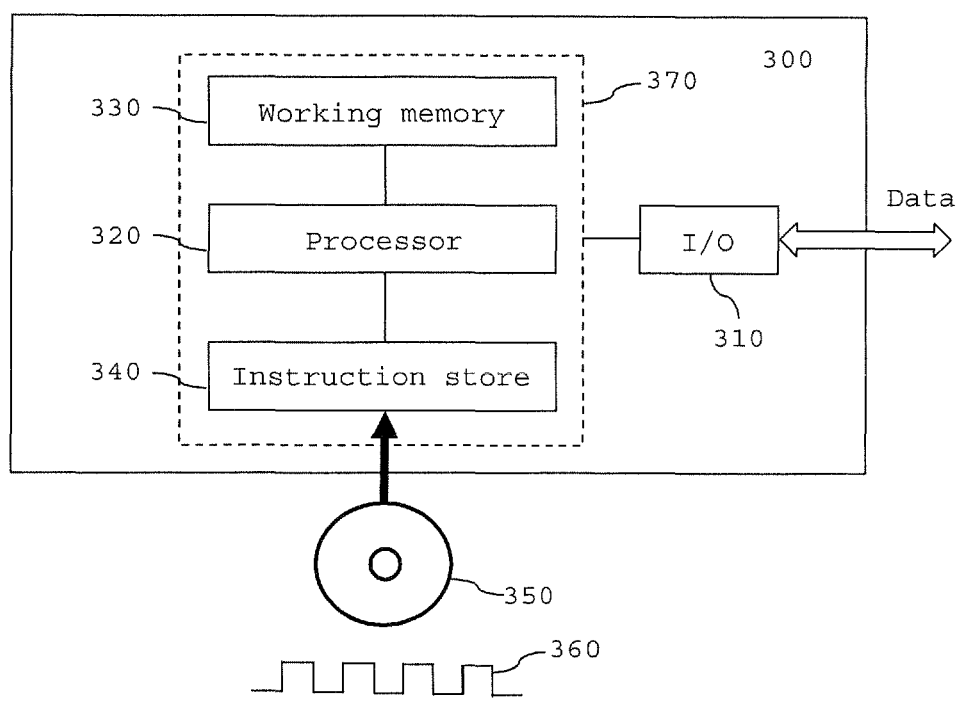
FIG. 7 illustrates a programmable data processing apparatus used to implement the operation mode setting module of the SMPS shown in FIG. 5.

An example of a general kind of programmable signal processing apparatus in which the operation mode setting module 260 may be implemented is shown in FIG. 7. The signal processing apparatus 300 shown in FIG. 7 comprises an input/output section 310, a processor 320, a working memory 330, and an instruction store 340 storing computer-readable instructions which, when executed by the processor 320 cause the processor 320 to function as a operation mode setting module 260 in performing the processing operations hereinafter described to cause the operation mode of the SMPS 200 to change in dependence upon the SMPS load.

The instruction store 340 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 340 may comprise a volatile memory (e.g. DRAM or SRAM), and the computer-readable instructions can be input thereto from a computer program product, such as a computer-readable storage medium 350 (e.g. an optical disc such as a CD-ROM, DVD-ROM etc.) or a computer-readable signal 360 carrying the computer-readable instructions.

The working memory 330 functions to temporarily store data to support the processing operations executed in accordance with the processing logic stored in the instruction store 340. As shown in FIG. 7, the I/O section 310 is arranged to communicate with the processor 320 so as to render the signal processing apparatus 300 capable of processing received signals and communicating its instructions to the driving circuit 230, for example.

The combination 370 of the processor 320, working memory 330 and the instruction store 340 (when appropriately programmed by techniques familiar to those skilled in the art) together constitute the operation mode setting module 260 of the present embodiment and may additionally provide the functionality of the error signal zeroing module 270. It should be noted that the combination 370 may also provide the function of at least one of the error signal generator 140, the DPWM controller 240 and the PID regulator 250 of the present embodiment.

Figure 8:
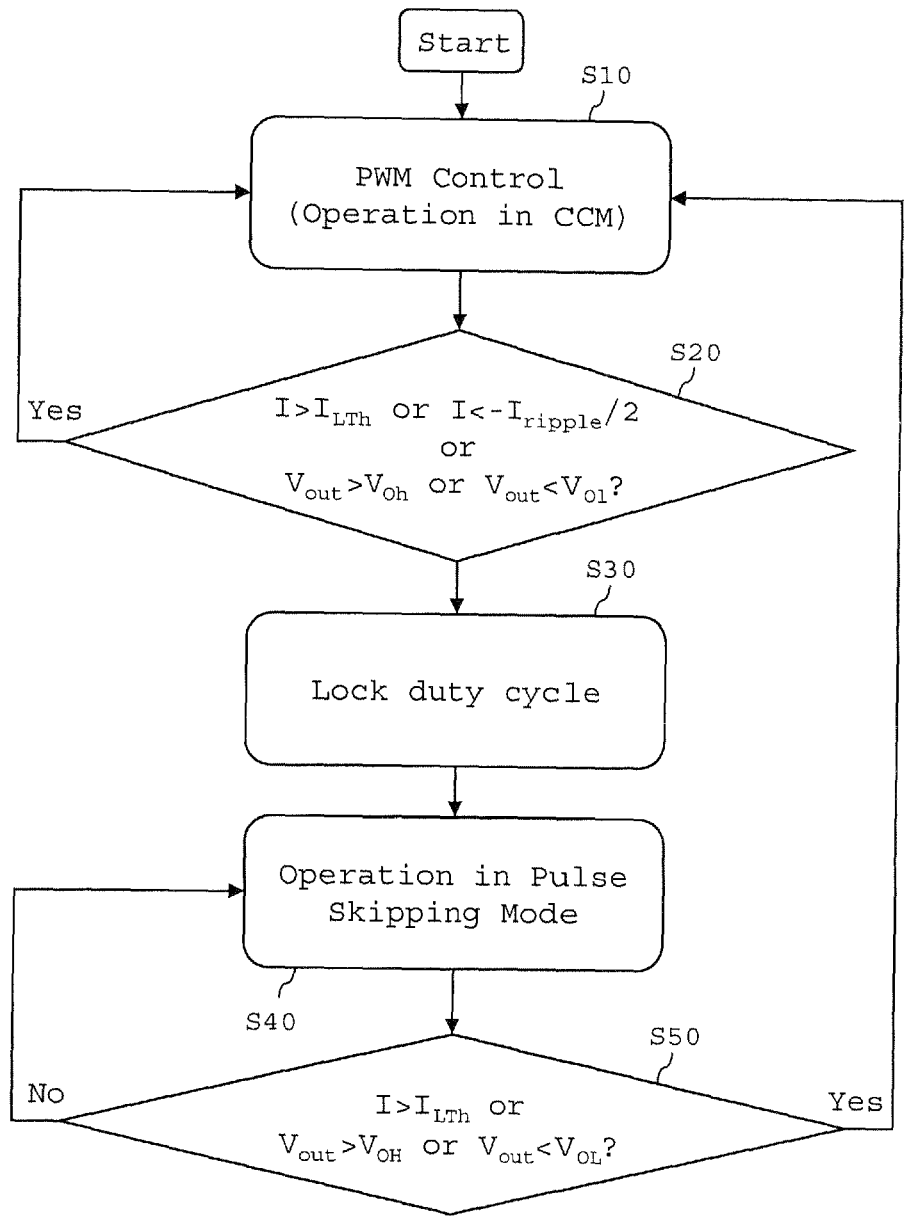
FIG. 8 is a flow chart illustrating a method of controlling the operation mode of an SMPS in dependence upon the inductor current level, in accordance with the first embodiment of the invention.

FIG. 8 is a flow chart showing the processing operations performed by the control circuit 210 of the present embodiment to control the operational mode of the SMPS 200.

Figure 2:
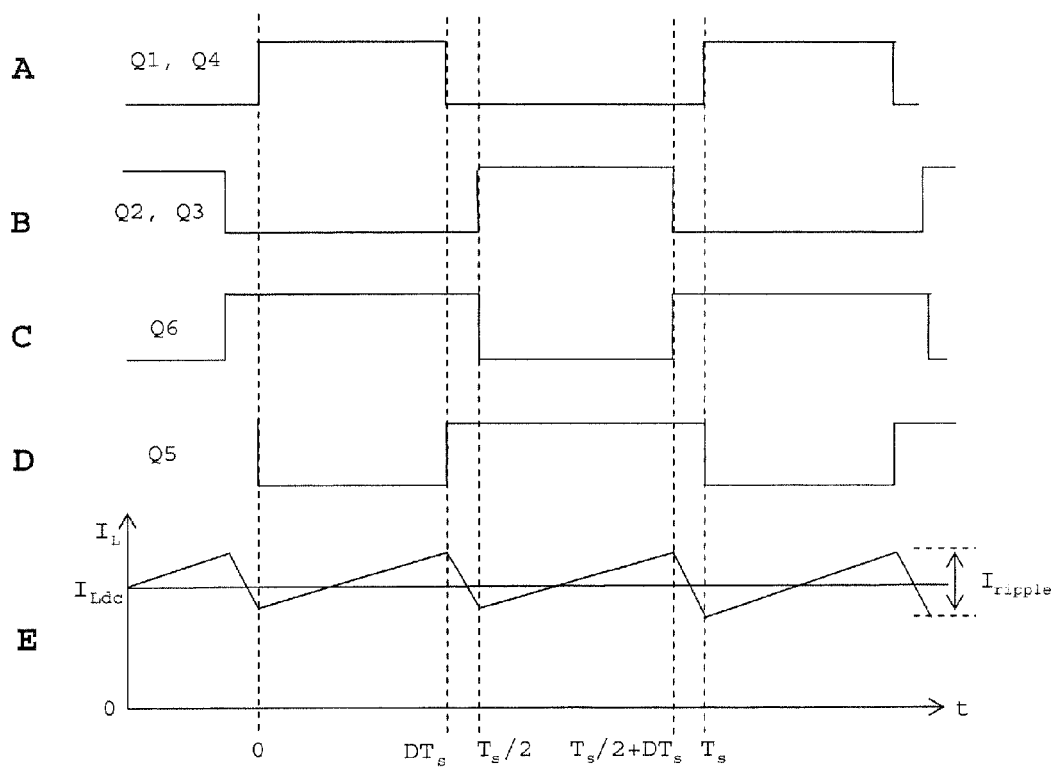
FIG. 2 illustrates timing diagrams for operating transistors Q1-Q6 of FIG. 1 with a high duty cycle and the consequent variation of the inductor current with time, which shows CCM operation.
Figure 3:
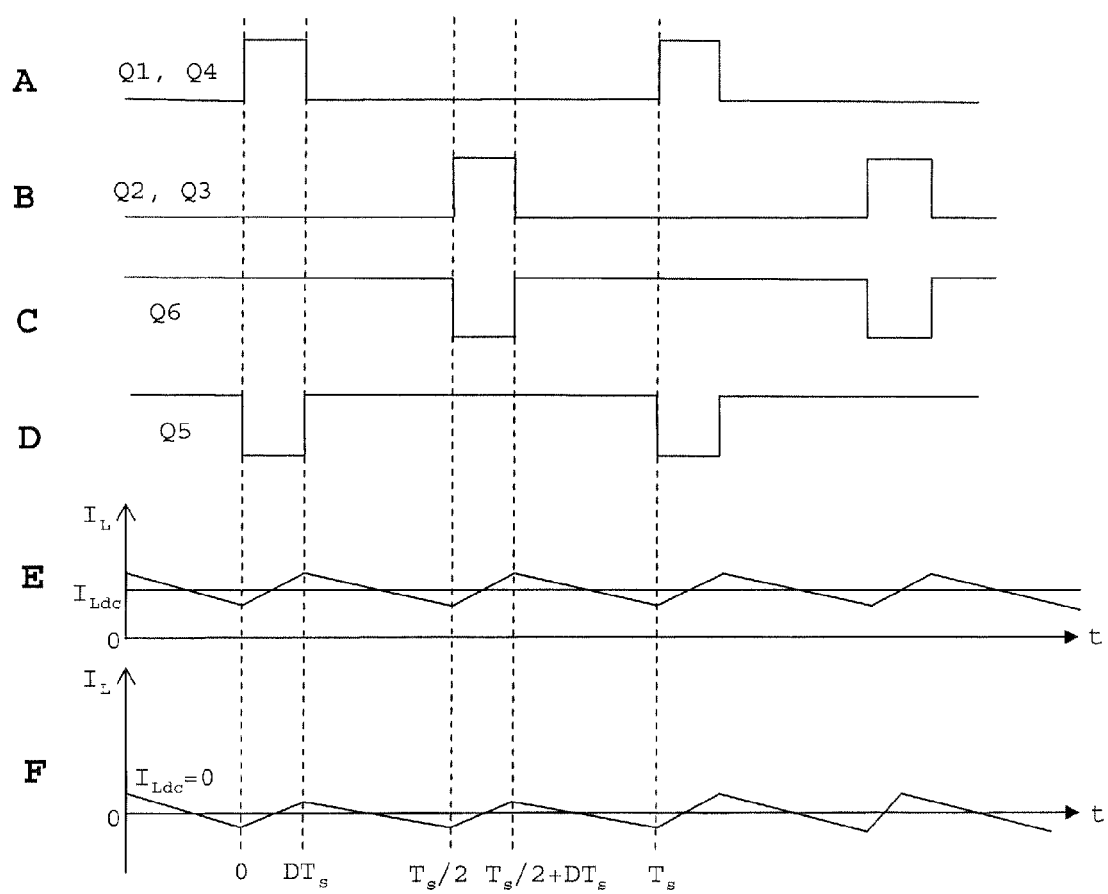
FIG. 3 illustrates timing diagrams for operating transistors Q1-Q6 of FIG. 1 with a low duty cycle and the consequent variation of the inductor current with time, which shows CCM operation.
Figure 4:
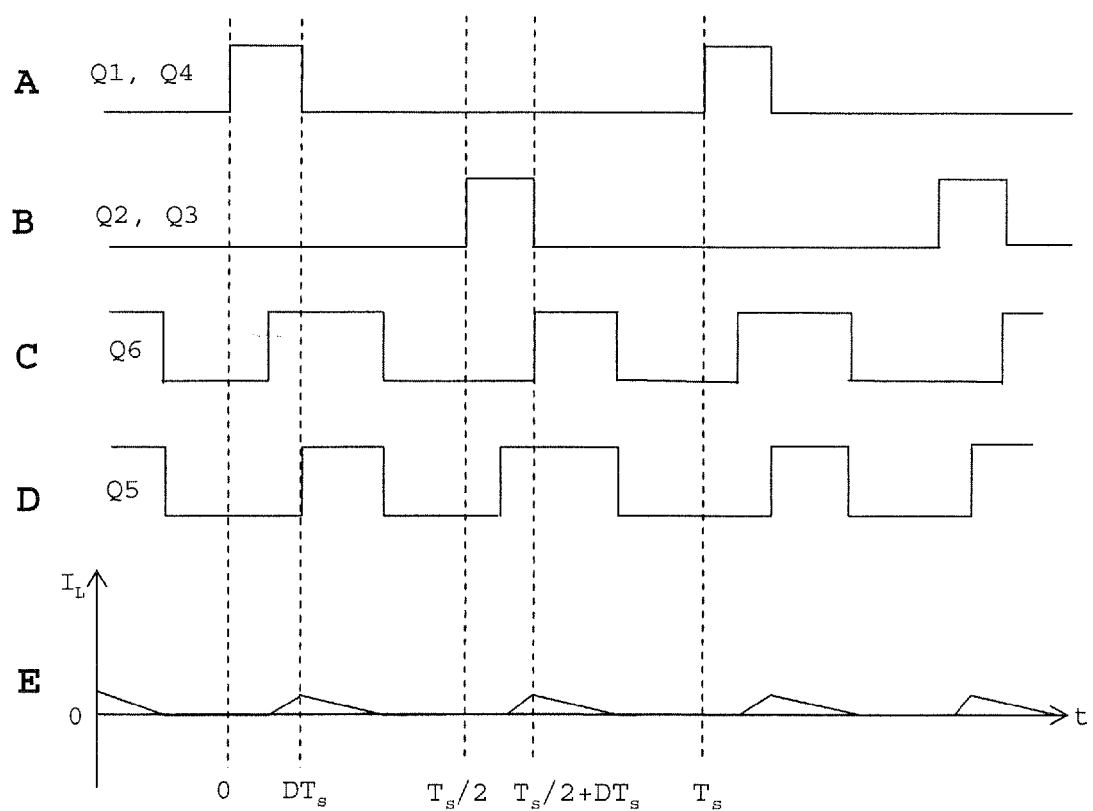
FIG. 4 illustrates timing diagrams for operating transistors Q1-Q6 of FIG. 1 such that the SMPS operates in DCM, and the consequent variation of the inductor current with time.

In the example of FIG. 8, the SMPS 200 begins operating under the control of the DPWM controller 240, in step S10. In this state, the output voltage $V_{out}$ of the SMPS 200 is regulated by the control circuit 210 while the inductor current of the SMPS 200 remains above zero (as illustrated in trace E in FIG. 2), such that the SMPS 200 operates in the continuous conduction mode. During the operation in step S10, the operation mode setting module 260 receives the signal I that is indicative of the inductor current $I_L$, and a signal that is indicative of the SMPS output voltage, $V_{out}$.

In step S20, the operation mode setting module 260 uses the received signal I to determine whether the inductor current $I_L$ exceeds a threshold value, $I_{LTh}$. In this embodiment, the threshold value is selected to be $I_{ripple}/2$, which is the amplitude of the ripple current in the inductor 170. The threshold current $I_{LTh}$ defines the boundary between light load operation ($I_L \leq I_{LTh}$) and normal operation ($I_L > I_{LTh}$).

Furthermore, in order to prevent possible damage to the secondary side transistors Q5 and Q6 that might occur in consequence of an abrupt drop in the SMPS load current, the operation mode setting module 260 also determines at step S20 whether the inductor current $I_L$ is smaller than $-I_{ripple}/2$ at any stage during the switching cycle. The reason for this safeguard is that switching OFF transistors Q5 and Q6 while a large reverse current is flowing through the inductor 170 risks damaging or destroying these transistors. It is therefore undesirable for transistors Q5 and Q6 to be switched OFF if a reverse current greater than $I_{ripple}/2$ flows through the inductor 170.

In step S20, the operation mode setting module 260 preferably also determines, as in the present embodiment, whether the output voltage $V_{out}$ is outside the voltage range $V_{Ol} \leq V_{out} \leq V_{Oh}$. If this is the case, then it is preferable for the SMPS 200 to forgo the efficiency improvements gained as a result of operating in the pulse-skipping mode described below, and to instead regulate the output voltage $V_{out}$ to keep it within the prescribed range.

If the operation mode setting module 260 determines at step S20 that the inductor current $I_L > I_{LTh}$, and/or that the inductor current $I_L < -I_{ripple}/2$, and/or that the output voltage $V_{out}$ is outside the aforementioned range [$V_{ol}$, $V_{Oh}$], the operation mode setting module 260 controls the switching control signal generator 220 to maintain the operation of the SMPS 200 in the continuous conduction mode, and the process returns to step S10. In this case, the operation mode setting module 260 issues an instructing signal to error signal zeroing module 270 which causes the error signal zeroing module 270 to relay the error signal $V_{error}$ (as received) to the PID controller 250.

On the other hand, if the operation mode setting module 260 determines in step S20 that the inductor current $I_L$ not greater than $I_{LTh}$, that $I_L$ is not smaller than $-I_{ripple}/2$, and that the output voltage $V_{out}$ is within the aforementioned voltage range $[V_{ol}, V_{Oh}]$, then in step S30 the operation mode setting module 260 locks the duty cycle according to which the switching control signal generator 220 operates. More specifically, the operation mode setting module 260 transmits an instructing signal ("D Lock") to the error signal zeroing module 270 to cause the error signal zeroing module 270 to output to the PID controller 250 an error signal indicating that there is no difference between the reference voltage $V_{ref}$ and the output voltage $V_{out}$, thereby causing the duty cycle D value output by the PID controller 250 to be locked, as described above.

Furthermore, if none of the conditions tested for in step S20 are satisfied, the operation mode setting module 260 generates and transmits to the driving circuit 230 appropriate "P-override" and "S-override" control signals in step S40, which cause the primary and secondary override circuits 232-2 and 234-2 to override the PWM signals from the DPWM controller 240 and stop the operation of the respective logic and dead time circuits, 232-1 and 234-1. The operation mode setting module 260 thus causes the SMPS 200 to change from operating in the continuous conduction mode to operating in the pulse skipping mode. In the pulse skipping mode, transistor gate drive pulses, which would be applied in one or more switching periods during normal operation of the SMPS 200 in CCM under the control of the DPWM controller 240, are skipped. In other words, transistors Q1-Q6 are turned OFF for at least one switching cycle. Moreover, in the present embodiment, transistors Q1-Q6 remain OFF throughout the operation of the SMPS 200 in the pulse skipping mode.

In order to prevent a transfer of energy from the secondary side to the primary side of the power train 180 of the SMPS 200, the operation mode setting module 260 causes the switching control signal generator 220 to generate the control signals $S_{Q1}$ to $S_{Q6}$ to change the operation of the SMPS 200 from CCM to PSM by turning OFF transistors Q5 and Q6 in a first switching period, and turning OFF transistors Q1-Q4 in the next switching period. This is achieved in the present embodiment by appropriately timing the transmission of the override signals "P-override" and "S-override" from the operation mode setting module 260.

While the SMPS 200 is operating in the pulse skipping mode, the operation mode setting module 260 continues to monitor the inductor current $I_L$ and output voltage $V_{out}$. In step S50, the operation mode setting module 260 determines whether the inductor current $I_L$ is greater than the threshold value $I_{LTh}$, and whether the output voltage $V_{out}$ is outside a second range of values that encompasses the first range of voltages $[V_{Ol}, V_{Oh}]$, i.e. whether $V_{out}>V_{OH}$ or $V_{out}<V_{OL}$, where $V_{OL}<V_{Ol}<V_{Oh}<V_{OH}$. Comparing the output voltage $V_{out}$ against a second set of range limits, which defines a second voltage range $[V_{oL}, V_{OH}]$ encompassing the first voltage range $[V_{Ol}, V_{Oh}]$, prevents an undesirable oscillation between the CCM and PSM operational modes.

If any of the conditions $I_L>I_{LTh}$, $V_{out}>V_{OH}$ and $V_{out}<V_{OL}$ is satisfied at step S50, the operation mode setting module 260 instructs the driving circuit 230 to resume operating in accordance with the PWM signal from the DPWM controller 240, such that the switching control signal generator 220 again operates under PWM control (in step S10). Thus, the SMPS 200 changes from operating in PSM back to operating in CCM under PWM control. Since the value of the duty cycle D was locked by the operation mode setting unit 260 in step S30, the switching control signal generator 220 resumes operation in the continuous conduction mode using the locked value of the duty cycle D.

In this way, the operation mode setting module 260 ensures that the SMPS 200 operates efficiently under light loads, whilst ensuring that the output voltage $V_{out}$ remains within a desired range of values and that the transitions between operation in PSM under light loads and CCM at higher loads cause smaller transients in the output voltage $V_{out}$ than arise during the conventional transitions between CCM and DCM. The superior transient performance of the present embodiment will be demonstrated through the experimental results which are presented below.

Second Embodiment

An SMPS according to a second embodiment of the present invention will now be described. The SMPS of this embodiment is based on the same hardware as the first embodiment which has been describe above with reference to FIGS. 1 and 5, but differs in the configuration of the operation mode setting module 260. The operations performed by the control circuit of the present embodiment will now be described with reference to FIG. 9.

The control circuit 210 of the above-described first embodiment requires the provision of a current measuring device that is capable of measuring both positive and negative currents flowing through the inductor 170 (or another current flowing to the SMPS load 160). In cases when it not possible to measure a negative current or when it is not possible to make a quick transition from operation in the continuous conduction mode under PWM control to operation in the pulse skipping mode, a time-out is required. That is, the inductor current $I_L$ should be smaller than $I_{LTh}$ for a predetermined time $T_{lim}$, which should be long enough for the transient to disappear and the inductor current $I_L$ to stabilise. For convenience, the predetermined time $T_{lim}$ is set to a predetermined number of switching periods $T_s$ in the present embodiment. For example, $T_{lim}$ may be set to 5-20× $T_s$. The processing operations performed by the control circuit of the present embodiment to control the operational mode of the SMPS 200 in a way which meets these objectives are illustrated in FIG. 9.

Figure 9:
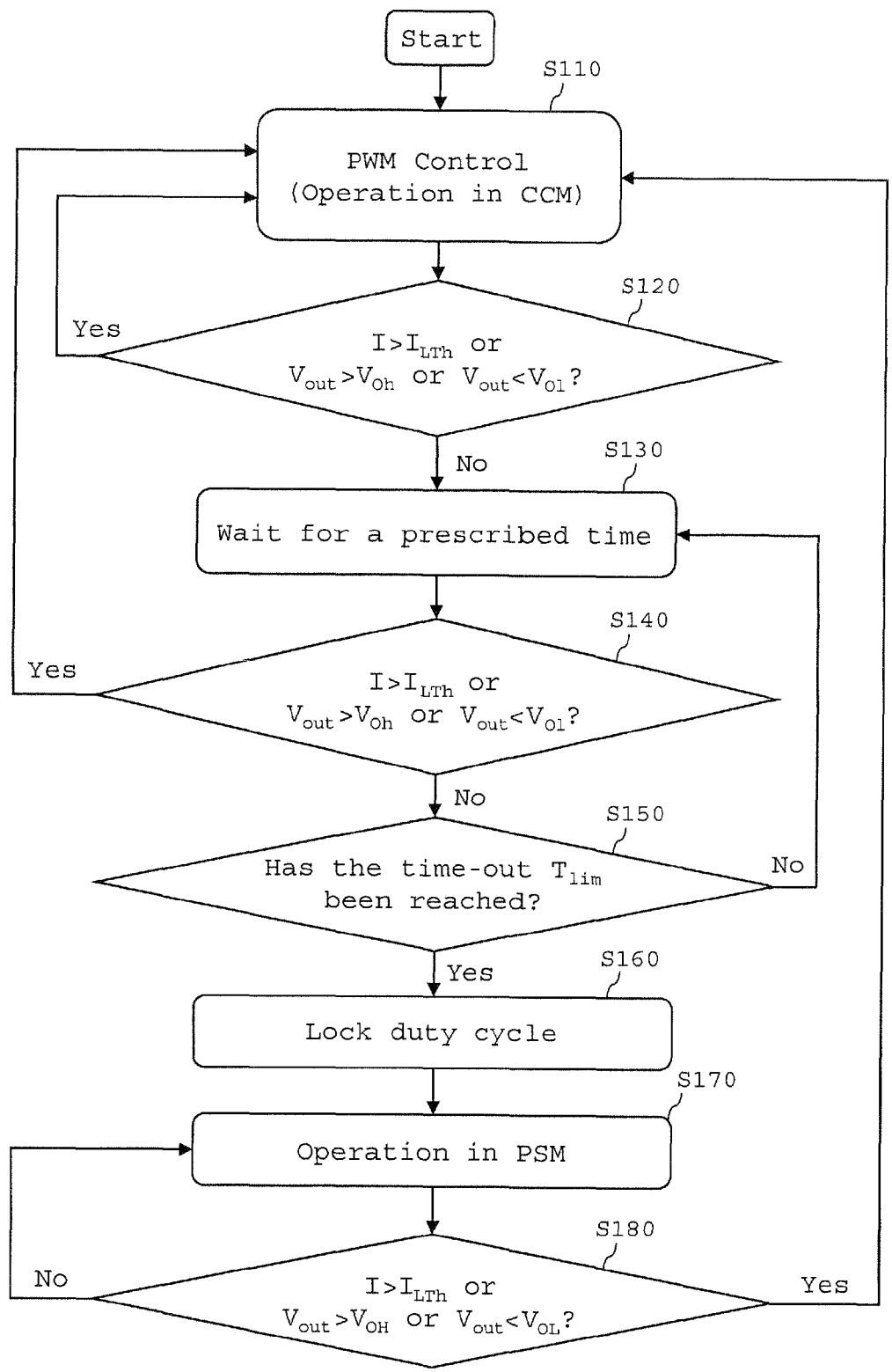
FIG. 9 is a flow chart illustrating a method of controlling the operation mode of an SMPS in dependence upon the inductor current level, in accordance with a second embodiment of the invention.

The processes illustrated in FIGS. 8 and 9 are similar in many respects. In particular, steps S110, S160, S170 and S180 of FIG. 9 as the same as steps S10, S30, S40 and S50 of FIG. 8, and will therefore not be described again. However, the operations performed by the control circuit of the present embodiment differ from those in the first embodiment by the omission of the condition $I_L<-I_{ripple}/2$ in step S120, which otherwise corresponds to step S20 in FIG. 8. Furthermore, as shown in FIG. 9, once the operation mode setting module 160 has determined at step S120 that $I_L \leq I_{LTh}$ and that $V_{Ol} \leq V_{out} \leq V_{Oh}$, the operation mode setting module 260 waits for a predetermined period of time (which is a fraction of $T_{lim}$, e.g. one or two switching periods $T_s$ in the present embodiment) at step S130, before repeating at step S140 the tests which were previously applied at step S120. The processes in steps S130 and S140 are then repeated until the predetermined period of time $T_{lim}$ has elapsed, whereupon the operation mode setting module 260 proceeds to perform the operations in steps S160-S180 (which, as noted above, correspond to steps S30-S50 in FIG. 8). However, if the operation mode setting module 260 determines at step S140 that any of the conditions tested for has been satisfied, the process proceeds to step S110.

Third Embodiment

An SMPS according to a third embodiment of the present invention will now be described. The SMPS of this embodiment is based on the same hardware as the first embodiment which has been describe above with reference to FIGS. 1 and 5, but differs in the configuration of the operation mode setting module 260, which further improves the efficiency of the SMPS at low output current levels by reducing transistor switching activity.

More specifically, whereas the operation mode setting module 260 of the first and second embodiments is configured to cause the operational mode of the SMPS 200 to change from PSM to CCM when the operation mode setting module 260 determines that $I_L > I_{LTh}$, $V_{out} > V_{OH}$ or that $V_{out} < V_{OL}$ (at step S50 in FIG. 8, and step S180 in FIG. 9), the operation mode setting module of the present embodiment determines, during operation of the SMPS 200 in the pulse skipping mode, whether the output voltage $V_{out}$ has moved below $V_{Ol}$ but remains at or above $V_{OL}$ and, upon determining that $V_{OL} \leq V_{out} < V_{Ol}$, causes the switching control signal generator 220 to generate control signals for switching transistors Q1-Q6 such that the SMPS 200 operates in the discontinuous conduction mode for at least one switching period $T_s$. Furthermore, the operation mode setting module 260 of the present embodiment maintains the DCM operation of the SMPS 200 until it determines that the output voltage $V_{out}$ has returned to being within the first predetermined range of values, i.e. $V_{Ol} \leq V_{out} \leq V_{Oh}$, whereupon the operation mode setting module 260 causes the driving circuit 230 to generate the control signals $S_{Q1}$-$S_{Q6}$ such that the SMPS 200 resumes operation in the pulse skipping mode. In this way, the operation mode setting module 260 charges the capacitor 190 in the output filter of the SMPS 200, thereby prolonging operation of the SMPS 200 in the pulse skipping mode and thus delaying the transition to operation in CCM under PWM control, which requires higher switching activity.

More specifically, upon determining that $V_{OL} \leq V_{out} < V_{Ol}$ during operation of the SMPS 200 in the pulse skipping mode, the operation mode setting module 260 controls the switching control signal generator 220 to generate control signals for switching transistors Q1-Q6 such that the SMPS 200 performs a process of operating in the discontinuous conduction mode for a single switching period $T_s$, and repeats this process until either: (i) the output voltage $V_{out}$ falls within the range $V_{Ol} \leq V_{out} \leq V_{Oh}$, whereupon the operation mode setting module 260 causes the switching control signal generator 220 to generate the control signals such that the SMPS 200 resumes operation in the pulse skipping mode; or (ii) the inductor current rises above the threshold $I_{LTh}$ or the output voltage $V_{out}$ moves outside the range $V_{OL} \leq V_{out} \leq V_{OH}$, whereupon the operation mode setting module 260 controls the switching control signal generator 220 to generate the control signals $S_{Q1}$-$S_{Q6}$ such that the SMPS 200 resumes operation in the continuous conduction mode. In case (ii), operation in CCM is resumed by the operation mode setting module 260 instructing the driving circuit 230 to resume operating in accordance with the PWM signal from the DPWM controller 240, such that the switching control signal generator 220 again operates under PWM control.

Figure 10:
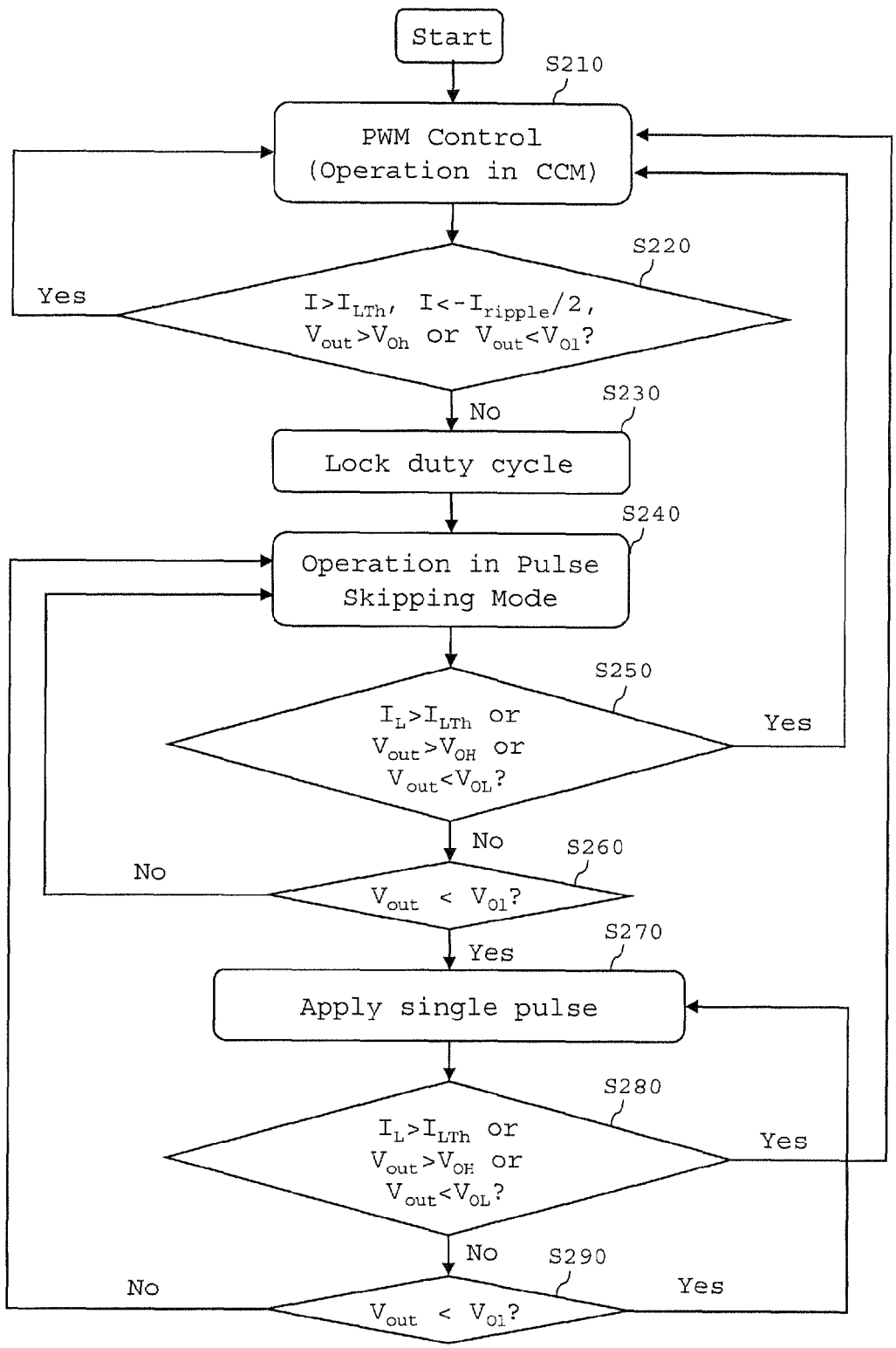
FIG. 10 is a flow chart illustrating a method of controlling the operation mode of an SMPS in dependence upon the inductor current level, in accordance with a third embodiment of the invention.

The above-described operation of the control circuit of the present embodiment is illustrated in FIG. 10. Steps S210 to S250 correspond to steps S10 to S50 of the first embodiment shown in FIG. 8, and the description thereof will therefore not be repeated. However, upon determining in step S250 that $I_L \leq I_{LTh}$ and that $V_{OL} \leq V_{out} \leq V_{OH}$, the operation mode setting module 260 determines in step S260 whether $V_{out} < V_{Ol}$ and, if not, maintains operation of the SMPS 200 in PSM. However, if the operation mode setting module 260 determines in step S260 that $V_{out} < V_{Ol}$, it controls the driving circuit 230 to generate transistor drive signals $S_{Q1}$-$S_{Q6}$ such that the SMPS 200 operates in DCM for a single switching period $T_s$ (i.e. with Q1-Q6 all being in the OFF state throughout the immediately preceding switching period and the immediately following switching period). In this way, a single charging pulse is applied to the capacitor 190.

Then, in steps S280 and S290, the operation mode setting module 260 repeats the processes of steps S250 and S260, respectively. In this way, the operation mode setting module 260 causes the application of a single charging pulse to the capacitor 190 and, if this is sufficient to cause the output voltage $V_{out}$ to return to being within the first prescribed voltage range [$V_{Ol}$, $V_{Oh}$], the operation mode setting module 260 causes all switching activity in the power train 180 to stop until it is determined that $I_L \leq I_{LTh}$ or that the output voltage $V_{out}$ is outside the second range [$V_{OL}$, $V_{OH}$]. On the other hand, if the single charging pulse was insufficient to bring the output voltage $V_{out}$ back into the first range [$V_{Ol}$, $V_{Oh}$], such that $V_{OL} \leq V_{out} < V_{Ol}$, then the operation mode setting module 260 causes another charging pulse to be applied, and the process is repeated.

It is noted that the value of the duty cycle used during operation in the discontinuous conduction mode may or may not correspond to the locked value of the duty cycle (set in step S230). The value of the duty cycle used during operation in DCM may be adjusted in order to optimise the number of single pulses used and/or the ripple levels during the PSM operation.

In step S270, synchronous rectification in the SMPS 200 can be configured in many ways, depending on current levels and technology for optimization of power efficiency. Examples are:
i) Diode rectification, using the body drain diodes in the transistors;
ii) Ideal diode simulation, i.e. switching ON the transistors during the forward phase of the switching cycle, and switching the) transistors OFF during the freewheeling phase when the current reverses;
iii) Load current level controlled switches, i.e., allowing the transistors to switch ON when the current is larger than a certain limit; and
iv) Switching the transistors ON only during the ON-time. In this case, the body drain diodes are used during the freewheeling phase of the switching cycle. This requires the primary and secondary side transistors to be enabled differently.

Fourth Embodiment

Figure 11:
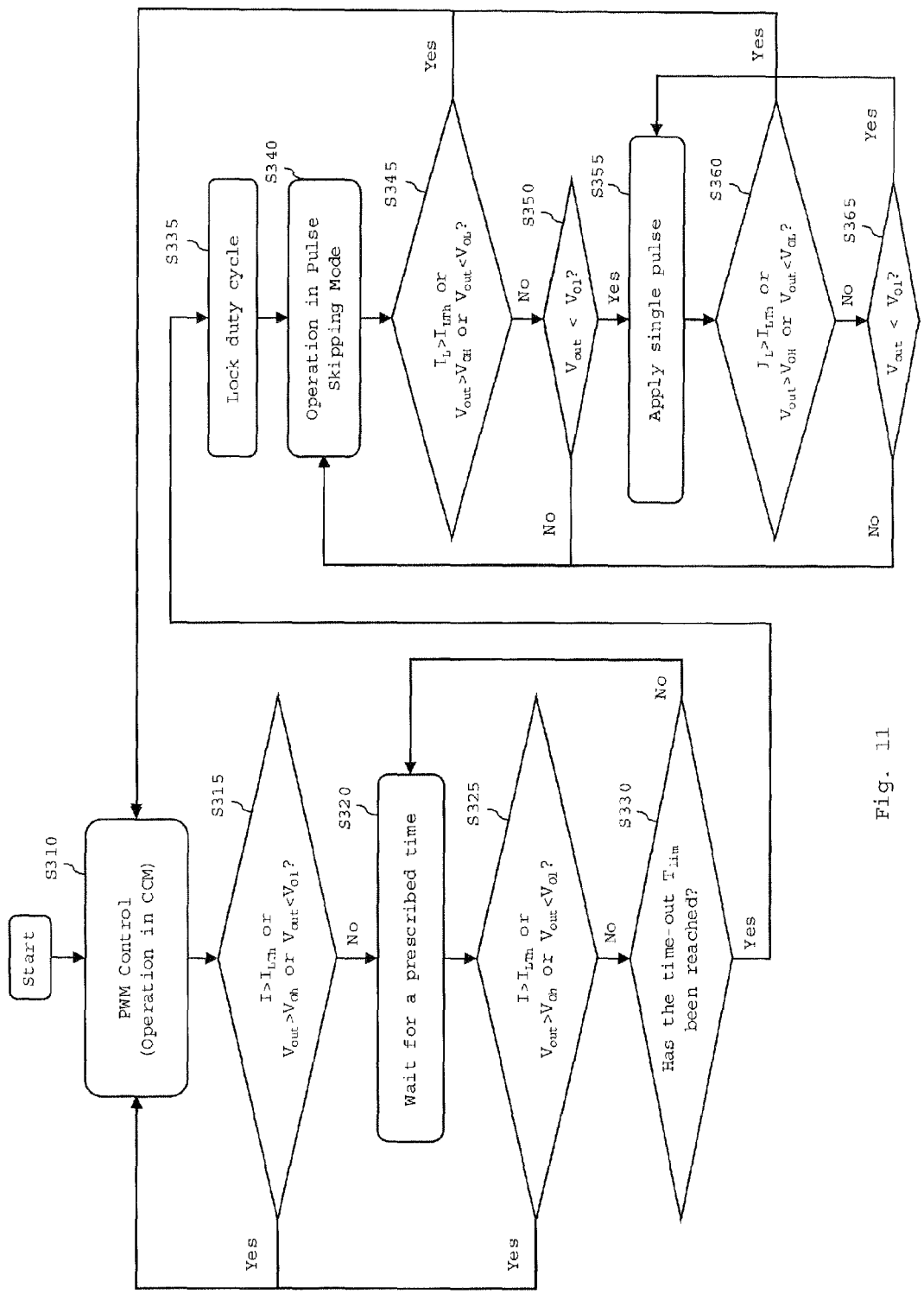
FIG. 11 is a flow chart illustrating a method of controlling the operation mode of an SMPS in dependence upon the inductor current level, in accordance with a fourth embodiment of the invention.

A method of controlling the operational mode of an SMPS according to a fourth embodiment of the present invention is illustrated in FIG. 11. The present embodiment combines the features of the second and third embodiments and thus provides the advantages of both of these embodiments. Accordingly, steps S310-S330 in FIG. 11 correspond to steps S110-S150 in FIG. 9, while steps S335-S365 in FIG. 11 correspond to steps S230-S290 in FIG. 10.

Experimental Results

The SMPS used in these experiments included a power train with a primary side full-bridge arrangement and centre-tapped secondary side synchronous rectification circuit, as has been described above with reference to FIG. 1. The input voltage $V_{in}$ was set at 54 V and the nominal output voltage, $V_{norm}$, was 12V. The PID regulator design was adjusted for the CCM mode using standard rules of thumb, by placing one zero at the resonance frequency of the output LC filter and the other zero one octave below, and adjusting the gain for appropriate gain and phase margins. The SMPS was controlled according to one of the following control strategies:

Strategy 1: PWM control, keeping the SMPS operating in the continuous conduction mode regardless of the current load level (referred to in FIGS. 12-17 and the following description as "Standard PWM with CCM");

Strategy 2: PWM control, using diode emulation to cause the SMPS to operate in DCM at light current loads (also referred to herein as "Standard PWM with DCM");

Strategy 3: CCM operation under PWM control at higher loads, combined with operation in PSM at light loads, in accordance with the first embodiment described above (also referred to herein as "PWM with pulse skipping"); and Strategy 4: CCM operation under PWM control at higher loads, combined with operation in PSM with DCM-type capacitor charging pulses at light loads, in accordance with the third embodiment described above (also referred to herein as "PWM with pulse skipping and DCM single pulse").

The voltage thresholds (in Volts) used in these experiments were as follows:

$V_{OL}$=11.97; $V_{Ol}$=11.98; $V_{nom}$=12.00; $V_{Oh}$=12.02; $V_{OH}$=12.03

In general, these limits should, of course, be adjusted for the technology used, e.g. limited by an analog-to-digital converter (ADC) when using a digital implementation.

Experiment 1

Slow Transition

Figure 12:
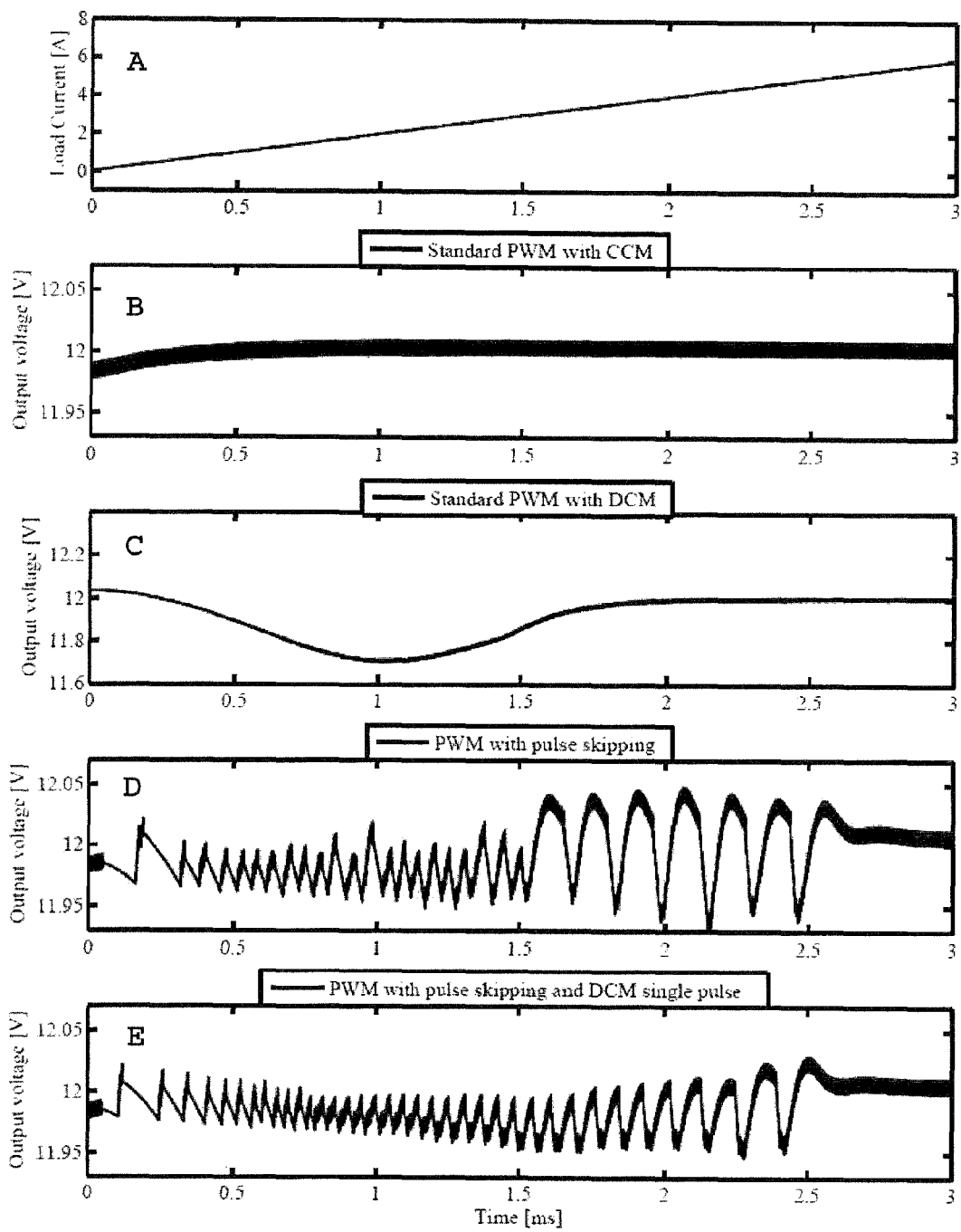
FIG. 12 shows the variations of the SMPS output voltage that are observed when the SMPS is controlled to provide for a steadily increasing load current (shown in trace A) using conventional control strategies (traces B and C) and the methods according to embodiments of the present invention (traces D and E)

This test was performed to check the behaviour of the SMPS during a gradual load current increase from 0 to 6 A, as shown in trace A in FIG. 12. The inductor current $I_L$ during operation of the SMPS in CCM changed from alternating between positive and negative values to always being positive.

The output voltages from the different control strategies are shown in traces B-E in FIG. 12. Trace B shows the output voltage variation observed when the SMPS was controlled using control strategy 1, which shows there to be an almost constant current ripple. Trace C shows the output voltage variation observed when the SMPS was controlled using control strategy 2; this shows a much smaller current ripple but a slower and more pronounced voltage deviation due to the transition from DCM to CCM. The PID gain in this case was 12 dB higher to decrease the voltage deviation. Hence, a gain scheduling approach was required to achieve satisfactory performance during the DCM/CCM transitions.

Trace D in FIG. 12 illustrates the output voltage variation observed when the SMPS was controlled according to control strategy 3. This control scheme shows good behaviour, with the output voltage deviation being smaller than that observed when the SMPS is controlled according to strategy 2 (trace C). Trace D shows there to be a smooth transition between operation in PSM and CCM.

Trace E in FIG. 12 illustrates the output voltage variation observed when the SMPS was controlled according to control strategy 4. These results show that the switching activity is reduced as compared with the simpler control strategy of the first embodiment (trace D). It also shows smooth transitions between the different control regimes (CCM, and PSM with and without the DCM pulses), and the voltage deviations are further reduced compared with the former control strategy.

Figure 13:
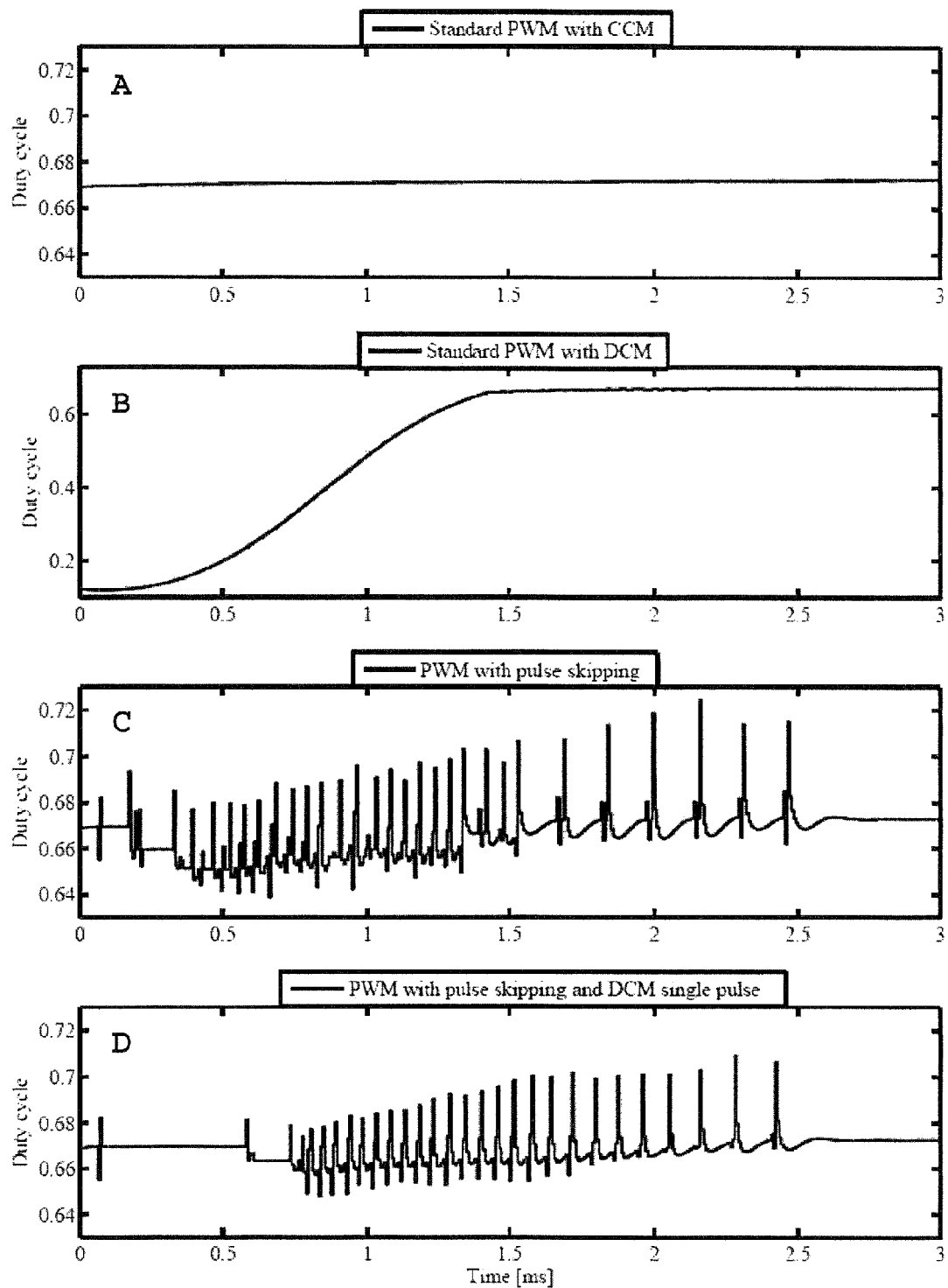
FIG. 13 shows the variations of the SMPS duty cycle that are applied when the SMPS is controlled to provide for a steadily increasing load current using conventional control strategies (traces A and B) and the methods according to embodiments of the present invention (traces C and D)

FIG. 13 shows the corresponding duty cycle variations. The almost constant duty cycle observed in the case of control strategy 1 (trace A in FIG. 13) contrasts with the large variations in the duty cycle that are required when the SMPS is controlled according to control strategy 2 (trace B in FIG. 13). Control strategy 3, which locks the duty cycle during the pulse skipping, shows only a small transient when operation under PWM control begins. The locking of the duty cycle reduces the time required for operation under PWM control to regulate the output voltage to its nominal value. Trace D shows that use of control strategy 4 reduces transients that accompany the transition from operation in PSM to operation in CCM.

Figure 14:
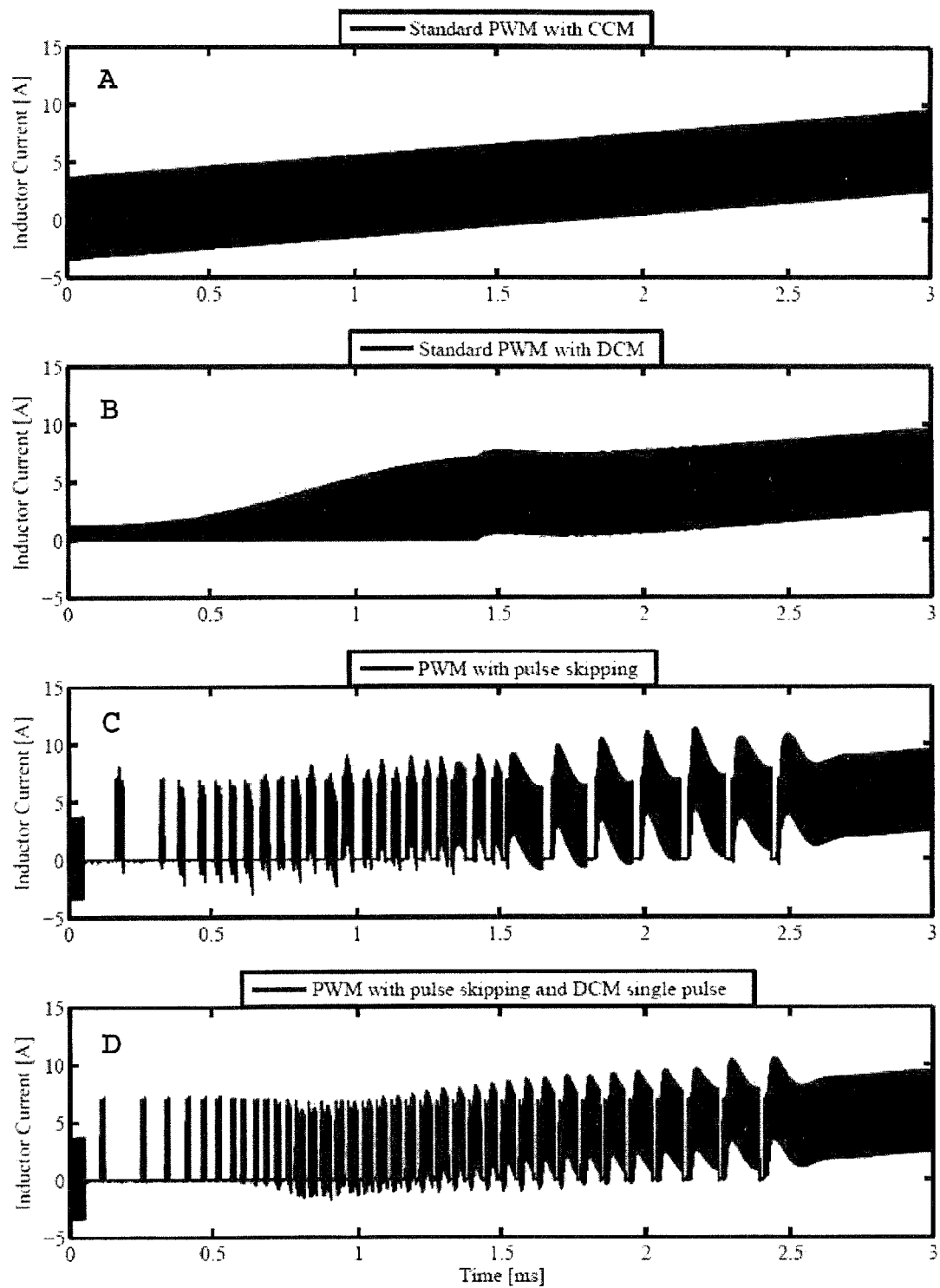
FIG. 14 shows the variations of the inductor current that are observed when the SMPS is controlled to provide for a steadily increasing load current using conventional control strategies (traces A and B) and the methods according to embodiments of the present invention (traces C and D)

FIG. 14 shows the corresponding inductor current variations. Trace A of FIG. 14 clearly shows that the current was negative at light load levels when the SMPS was controlled according to control strategy 1. When the SMPS was controlled according to control strategy 2, trace B shows that the inductor current was always positive, and during operation under light loads, the inductor current was discontinuous and equal to zero during the last part of each switch cycle. When the SMPS was controlled according to control strategy 3, trace C shows that the inductor current was zero during the periods when the SMPS stopped switching. Finally, when the SMPS was controlled according to control strategy 4, trace D shows that the current remained positive during operation at low current levels, when single DCM pulses were being applied.

Experiment 2

Fast Transient

Figure 15:
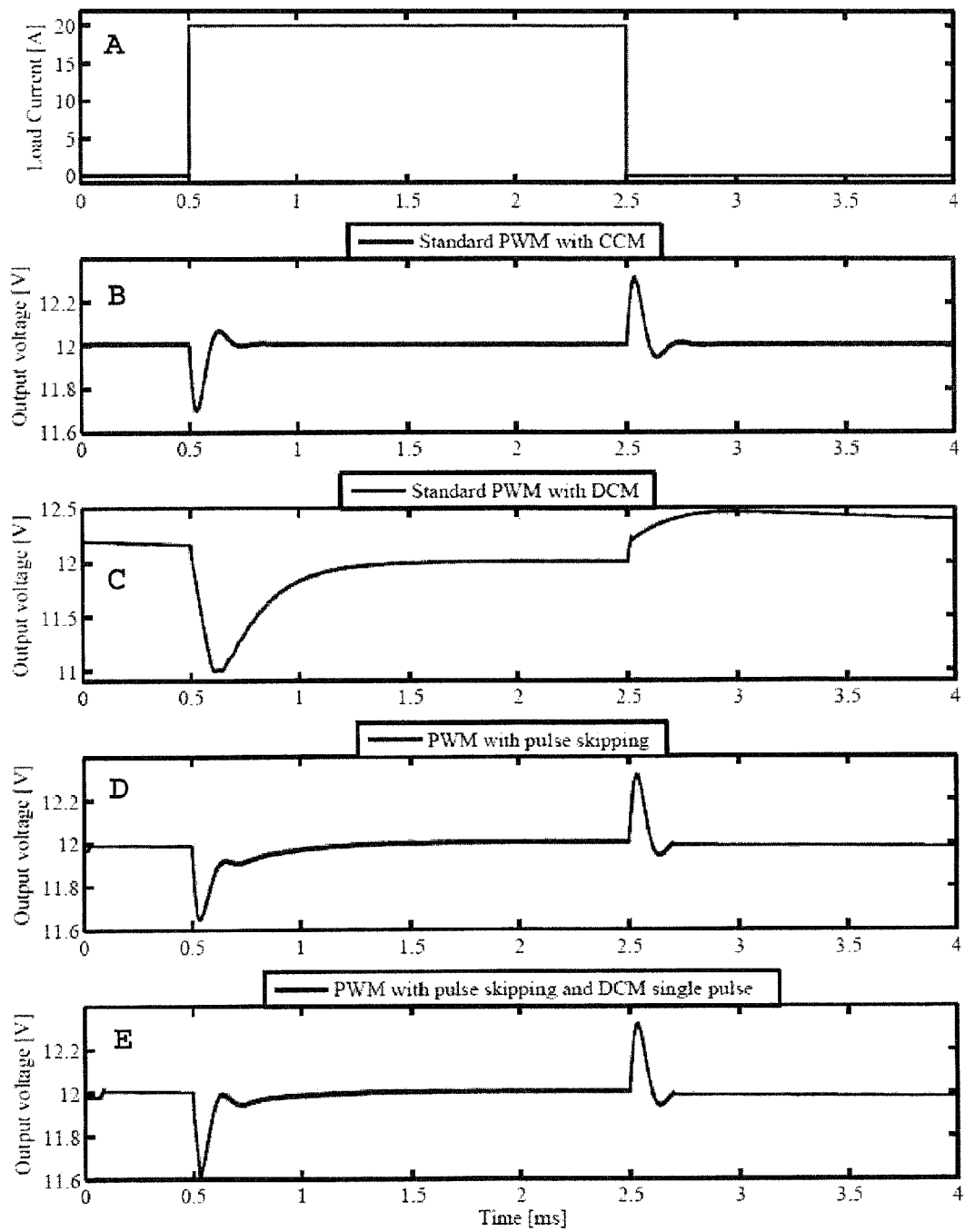
FIG. 15 shows the variations of the SMPS output voltage that are observed when the SMPS is controlled to respond to an abrupt increase and a subsequent abrupt decrease in the load current (shown in trace A) using conventional control strategies (traces B and C) and the methods according to embodiments of the present invention (traces D and E)

The behaviour during load transients was tested with a square wave-shaped load step of 0-20-0 A, which is illustrated in trace A of FIG. 15. The output voltage variations during these load steps are shown in traces B-E in FIG. 15 for the different control strategies.

When the SMPS was controlled according to control strategy 1, voltage deviations of ±0.31 V were observed, as shown in trace B. When the SMPS was controlled according to control strategy 2, deviations of −1/+0.46 V were observed (trace C), despite the extra gain of 12 dB; this clearly shows the problem with switching between the DCM and CCM. Control of the SMPS in accordance with control strategy 3 (trace D) yielded voltage deviations of −0.35/+0.32V, which are almost the same as those observed in trace B. Control of the SMPS in accordance with control strategy 4 (trace E) yielded a result that was little worse, with fluctuations of −0.39/+0.32V.

Figure 16:
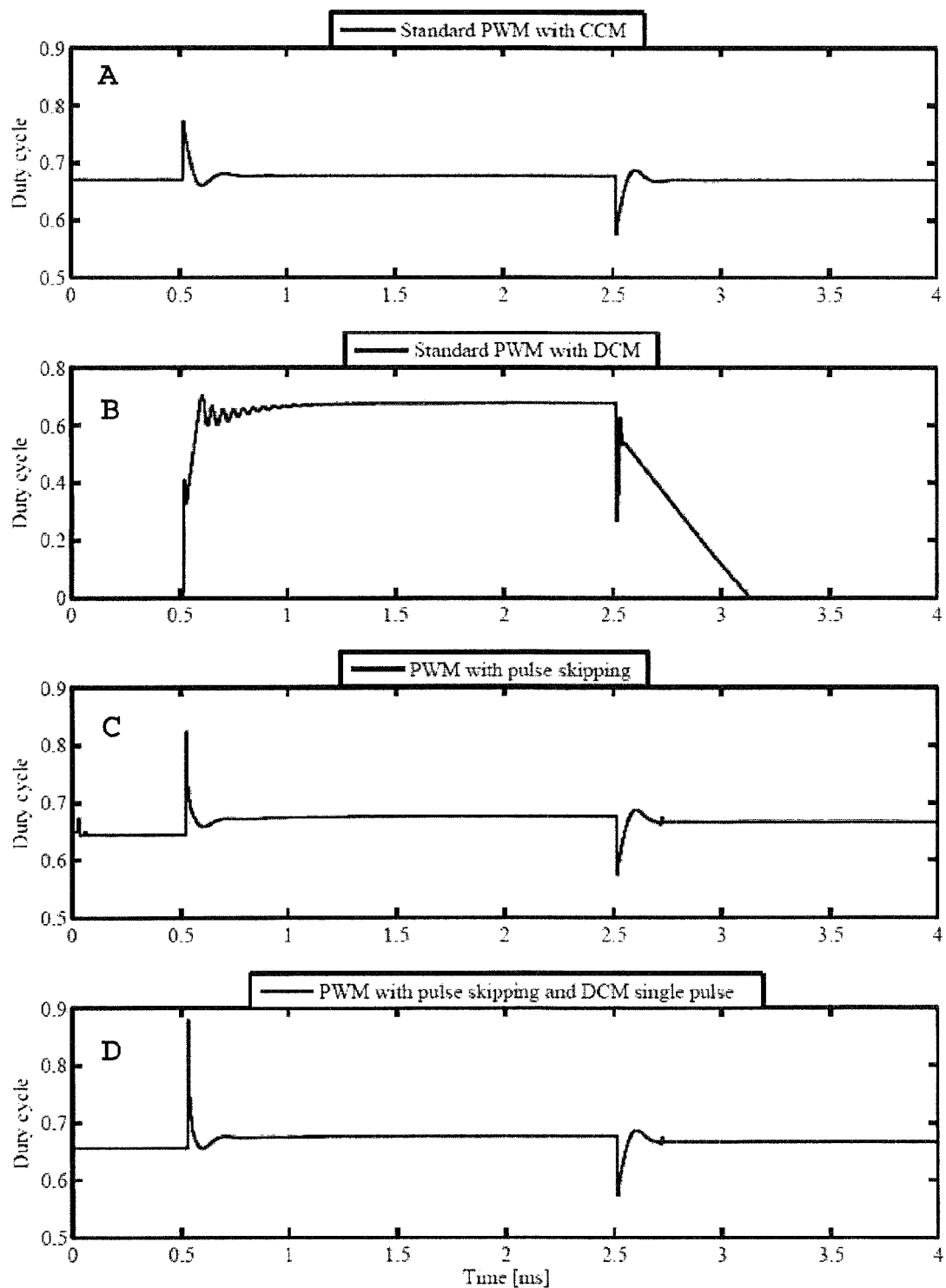
FIG. 16 shows the variations of the SMPS duty cycle that are applied when the SMPS is controlled to provide for the load current variation shown in trace A of FIG. 15 using conventional control strategies (traces A and B) and the methods according to embodiments of the present invention (traces C and D)

FIG. 16 shows the duty cycle variations required for the different control strategies. The difference between the duty cycle variations that are required in the case of control strategies 1 and 2 is clear from a comparison of traces A and B in FIG. 16. In the case of control strategy 2, the large change in the duty cycle that is required when changing from DCM to CCM mode takes time, and the output voltage deviation consequently becomes larger. However, control strategies 3 and 4 according to embodiments of the present invention require duty cycle variations that are almost the same as the variation required under control strategy 1, as can be appreciated from a comparison of traces C and D with trace A. However, due to the small delay associated with switching between the CCM and PSM modes, the duty cycle changes are slightly larger for control strategies 3 and 4.

Figure 17:
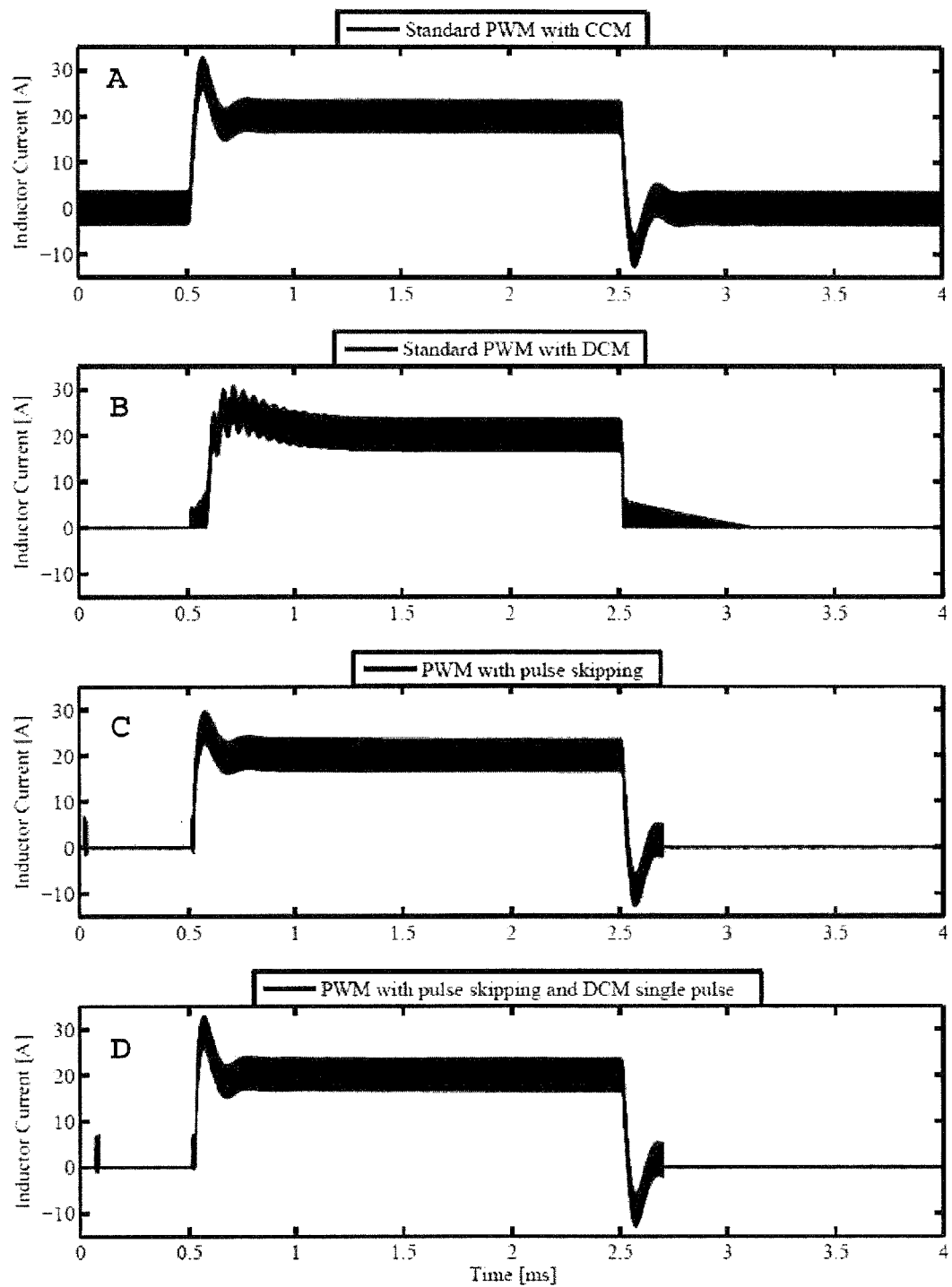
FIG. 17 shows the variations of the inductor current that are observed when the SMPS is controlled to provide for the load current variation shown in trace A of FIG. 15 using conventional control strategies (traces A and B) and the methods according to embodiments of the present invention (traces C and D)

FIG. 17 shows the inductor current variations for the different control strategies. The inductor current variations observed when the SMPS is operated according to control strategies 1 and 2 are clearly different, as can be appreciated from a comparison of traces A and B in FIG. 17. The increase in the inductor current was much slower for control strategy 2 because the duty cycle was required to change over a larger range. The response of the inductor current to load release, i.e. the drop in the load current (at time t=2.5 ms), also showed a slower change, and since the excess energy in the inductor cannot be reversed to the input of the SMPS, the output voltage must be decreased by the load current. Since the load current was low (almost zero) after the load release, the output voltage remained high for a long time. Control strategies 3 and 4 combine the good behaviours from the DCM and CCM modes, i.e. no or low current ripple during light load, and the ability to reverse energy during load release, which yields load transient behaviour which is almost as good as that observed during conventional PWM-controlled operation in CCM.

Modifications and Variants

Many modifications and variations can be made to the embodiments, without departing from the scope of the present invention.

Figure 18:
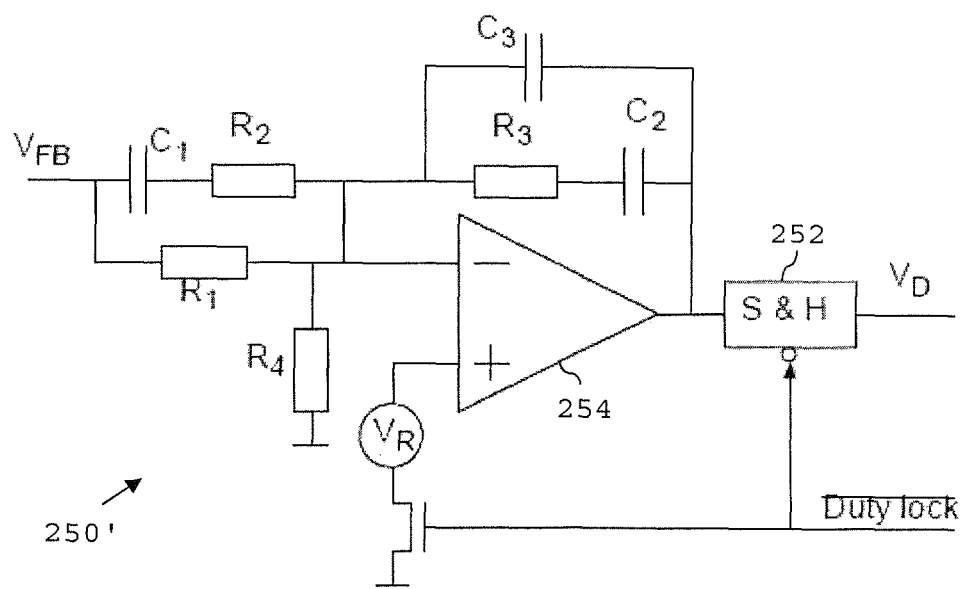
FIG. 18 shows a Type-3 analog PID controller comprising a Sample & Hold circuit, which can be controlled by the operation mode setting module described herein to lock the duty cycle.

For example, in the above-described embodiment, the control circuit 210 employs a digital PID controller 250, and techniques for locking the duty cycle D in such a digital implementation were described. However, the PID controller may alternatively be implemented in the analog domain. An example of such an analog implementation is shown in FIG. 18, specifically a standard Type-3 analog PID controller 250'. In this analog PID controller 250', the steady state duty cycle ratio value is stored in the capacitors. One possible way of locking the duty cycle D in this case is to use a Sample & Hold circuit 252, sampling the output of the operational amplifier 254 and making the reference voltage $V_R$ float, which means that the error signal will be zero and the voltage over capacitors C2 and C3 will be constant.

More generally, the control circuit 210 can be implemented using either analog or digital electronics, with no loss of performance. In a digital implementation of the control circuit 210, the components of the control circuit 210 shown in FIG. 5 may be implemented as software components of that may form at least a part of a computer program, module, object or sequence of instructions executable by a programmable signal processing apparatus such as a microprocessor, for example as shown schematically in FIG. 7.

Further, the control circuit 210 is not limited to controlling the SMPS topology of a full-bridge, center-tapped secondary side transformer with synchronous rectification, as shown in FIG. 5.

Instead, the above-described embodiments of the present invention will work equally well with many topologies including push-pull, half-bridge and forward converters topologies. The above-described control circuit 210 can be used with SMPSs with a single winding secondary side transformer.

In the above-described embodiments, a load transient is detected by measuring the inductor current or voltage deviations. A variant is to add a load current measurement circuit whose response is faster than the detection of voltage changed over the capacitors.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A control circuit operable to control switching elements in a switched mode power supply, comprising: a switching control signal generator operable to generate control signals for switching the switching elements such that the switched mode power supply converts an input voltage to an output voltage; and an operation mode setting module operable to receive a signal indicative of a current flowing to a load that is connected to an output of the switched mode power supply, and operable to cause the switching control signal generator to generate the control signals so as to operate the switched mode power supply in a continuous conduction mode or a pulse skipping mode in dependence upon the current, wherein in the pulse skipping mode the switching elements are turned OFF for at least one switching period of the switched mode power supply but the switched mode power supply continues to supply power to the load; wherein the operation mode setting module is operable to monitor the signal indicative of the current to determine whether the current exceeds a threshold, and is operable to control the switching control signal generator to generate the control signals such that, when the current exceeds the threshold, the switched mode power supply operates in the continuous conduction mode and, upon determining that the current has fallen to or below the threshold, operation of the switched mode power supply is changed from the continuous conduction mode to the pulse skipping mode so that the pulse skipping mode is entered from the continuous conduction mode; and wherein the operation mode setting module is further operable to: receive a second signal, which is indicative of the output voltage of the switched mode power supply; process the second signal to determine whether the output voltage is within a first predetermined range; upon determining both that the current has fallen to or below the threshold and that the output voltage is within the first predetermined range, control the switching control signal generator to generate the control signals such that operation of the switched mode power supply is changed from the continuous conduction mode to the pulse skipping mode; and upon determining that the current has dropped to or below the threshold but that the output voltage is outside the first predetermined range, control the switching control signal generator to maintain operation of the switched mode power supply in the continuous conduction mode.

2. The control circuit according to claim 1, wherein the operation mode setting module is operable to: monitor the signal indicative of the current to determine whether the current has dropped to or below the threshold for at least a predetermined period of time; monitor the signal indicative of the output voltage to determine whether the output voltage is within the first predetermined range for at least the predetermined period of time; and upon determining that the current has dropped to or below the threshold for the predetermined period of time and that the output voltage is within the first predetermined range for the predetermined period of time, control the switching control signal generator to generate the control signals such that operation of the switched mode power supply is changed from the continuous conduction mode to the pulse skipping mode.

3. The control circuit according to claim 1, wherein the operation mode setting module is operable to: process the signal indicative of the current to determine whether the current is less than −Iripple/2, where Iripple is a magnitude of a ripple current component of the current; and control the switching control signal generator to generate the control signals such that operation of the switched mode power supply is changed from the continuous conduction mode to the pulse skipping mode upon determining that the current has dropped to or below the threshold but not to below −Iripple/2 and that the output voltage is within the first predetermined range, and otherwise control the switching control signal generator to maintain operation of the switched mode power supply in the continuous conduction mode.

4. The control circuit according to claim 1, wherein the operation mode setting module is operable, after causing the switched mode power supply to enter the pulse skipping mode and upon determining that the current has risen above the threshold or that the output voltage has moved outside a second predetermined range that encompasses the first predetermined range, to cause the switching control signal generator to generate the control signals such that operation of the switched mode power supply changes from the pulse skipping mode to the continuous conduction mode.

5. The control circuit according to claim 1, wherein: the control circuit is operable to control the switched mode power supply comprising a primary side circuit having switching elements and a secondary side circuit having switching elements, the primary and secondary side circuits being coupled by a transformer; and the operation mode setting module is further operable, upon determining that the current has dropped to or below the threshold, to cause the switching control signal generator to generate the control signals to change the operation of the switched mode power supply from the continuous conduction mode to the pulse skipping mode by turning OFF the switching elements in the secondary side circuit in a first switching period and turning OFF the switching elements in the primary side circuit in a next switching period, so as to prevent a transfer of energy from the secondary side circuit to the primary side circuit.

6. The control circuit according to claim 1, wherein the operation mode setting module is arranged to provide a locked value of a duty cycle of the switching control signal generator when causing operation of the switched mode power supply to change from the continuous conduction mode to the pulse skipping mode.

7. The control circuit according to claim 1, wherein the threshold is Iripple/2, where Iripple is a magnitude of a ripple current component of the current.

8. A switched mode power supply comprising the control circuit according to claim 1.

9. The control circuit according to claim 4, wherein the operation mode setting module is further operable, during operation of the switched mode power supply in the pulse skipping mode, to determine whether the output voltage has moved below a first lower limit of the first predetermined range but remains above a second lower limit of the second predetermined range and, upon determining that the output voltage is between the first and second lower limits, to cause the switching control signal generator to generate control signals for switching the switching elements such that the switched mode power supply operates in a discontinuous conduction mode for at least one switching period of the switched mode power supply, and wherein the operation mode setting module is arranged to maintain the operation of the switched mode power supply in the discontinuous conduction mode until it determines that the output voltage has returned to being within the first predetermined range, whereupon the operation mode setting module is arranged to cause the switching control signal generator to generate the control signals such that the switched mode power supply resumes operation in the pulse skipping mode.

10. The control circuit according to claim 6, wherein the operation mode setting module is arranged to cause the switching control signal generator to resume operation using the locked value of the duty cycle when the switched mode power supply resumes operation in the continuous conduction mode after having operated in the pulse skipping mode.

11. The control circuit according to claim 6, further comprising: an error signal generator operable to receive a signal indicative of the output voltage of the switched mode power supply and generate an error signal based on a reference signal and the signal indicative of the output voltage; a PID or PI regulator operable to generate, in dependence upon the error signal, a signal defining the duty cycle to be used by the switching control signal generator; and an error signal zeroing module for setting the error signal to zero, wherein the operation mode setting module is arranged to provide the locked value of the duty cycle by causing the error signal zeroing module to set the error signal to zero.

12. The control circuit according to claim 9, wherein the operation mode setting module is further operable, upon determining that the output voltage is between the first and second lower limits during operation of the switched mode power supply in the pulse skipping mode, to control the switching control signal generator to generate control signals for switching the switching elements such that the switched mode power supply performs a process of operating in the discontinuous conduction mode for a single switching period of the switched mode power supply, and repeats the process until either: the output voltage falls within the first predetermined range, whereupon the operation mode setting module is arranged to cause the switching control signal generator to generate the control signals such that the switched mode power supply resumes operation in the pulse skipping mode, or the current rises above the threshold or the output voltage moves outside the second predetermined range, whereupon the operation mode setting module is arranged to cause the switching control signal generator to generate the control signals such that the switched mode power supply resumes operation in the continuous conduction mode.

13. The control circuit according to claim 11, wherein: the error signal zeroing module is arranged to receive the error signal from the error signal generator and an instructing signal and, in accordance with the instructing signal, either output an error signal indicating that there is no difference between the reference signal and the signal indicative of the output voltage, or relay the error signal to the PID or PI regulator; and the operation mode setting module is arranged to provide the locked value of the duty cycle by transmitting the instructing signal to the error signal zeroing module to cause the error signal zeroing module to output the error signal indicating that there is no difference between the reference signal and the signal indicative of the output voltage.

14. A method of controlling a switching control signal generator of a switched mode power supply to generate control signals for controlling switching elements in the switched mode power supply so as to convert an input voltage to an output voltage, comprising: monitoring a signal indicative of a current flowing to a load that is connected to an output of the switched mode power supply to determine whether the current exceeds a threshold; controlling the switching control signal generator to generate control signals for the switching elements so as to operate the switched mode power supply in a continuous conduction mode when the current is determined to exceed the threshold; upon determining that the current has fallen to or below the threshold, controlling the switching control signal generator to generate control signals for the switching elements so as to change an operation of the switched mode power supply from the continuous conduction mode to a pulse skipping mode, wherein the switching elements are turned OFF for at least one switching period of the switched mode power supply but the switched mode power supply continues to supply power to the load, such that the pulse skipping mode is entered from the continuous conduction mode; and further comprising: monitoring a second signal, which is indicative of the output voltage of the switched mode power supply, to determine whether the output voltage is within a first predetermined range; upon determining both that the current has fallen to or below the threshold and that the output voltage is within the first predetermined range, controlling the switching control signal generator to generate the control signals such that operation of the switched mode power supply is changed from the continuous conduction mode to the pulse skipping mode; and upon determining that the current has dropped to or below the threshold but that the output voltage is outside the first predetermined range, controlling the switching control signal generator to maintain operation of the switched mode power supply in the continuous conduction mode.

15. The method according to claim 14, comprising: monitoring the signal indicative of the current to determine whether the current has dropped to or below the threshold for at least a predetermined period of time; monitoring the signal indicative of the output voltage to determine whether the output voltage is within the first predetermined range for at least the predetermined period of time; and upon determining that the current has dropped to or below the threshold for the predetermined period of time and that the output voltage is within the first predetermined range for the predetermined period of time, controlling the switching control signal generator to generate control signals so as to change the operation of the switched mode power supply from the continuous conduction mode to the pulse skipping mode.

16. The method according to claim 14, comprising: processing the signal indicative of the current to determine whether the current is less than $-Iripple/2$, where Iripple is a magnitude of a ripple current component of the current; and controlling the switching control signal generator to generate control signals to change the operation of the switched mode power supply from the continuous conduction mode to the pulse skipping mode upon determining that the current has dropped to or below the threshold but not to below $-Iripple/2$ and that the output voltage is within the first predetermined range, and to otherwise maintain operation of the switched mode power supply in the continuous conduction mode.

17. The method according to claim 14, further comprising: after the switched mode power supply has entered the pulse skipping mode and upon determining that the current has risen above the threshold or that the output voltage has moved outside a second predetermined range that encompasses the first predetermined range, controlling the switching control signal generator to generate control signals to change the operation of the switched mode power supply from the pulse skipping mode to the continuous conduction mode.

18. The method according to claim 14, wherein: the switched mode power supply comprises a primary side circuit having switching elements and a secondary side circuit having switching elements, the primary and secondary side circuits being coupled by a transformer; and upon determining that the current has dropped to or below the threshold, the switching control signal generator is controlled to cause the switched mode power supply to change operation from the continuous operation mode to the pulse skipping mode, by turning OFF the switching elements in the secondary side circuit in a first switching period and turning OFF the switching elements in the primary side circuit in a next switching period, so as to prevent a transfer of energy from the secondary side circuit to the primary side circuit.

19. The method according to claim 14, further comprising: causing a duty cycle of the switching control signal generator to be locked to a locked value when operation of the switched mode power supply changes from the continuous conduction mode to the pulse skipping mode.

20. The method according to claim 14, wherein the threshold is $Iripple/2$, where Iripple is a magnitude of a ripple current component of the current.

21. A non-transitory computer-readable storage medium storing computer program instructions which, when executed by a processor, cause the processor to perform the method according to claim 14.

22. The method according to claim 17, further comprising: determining, during operation of the switched mode power supply in the pulse skipping mode, whether the output voltage has moved below a first lower limit of the first predetermined range but remains above a second lower limit of the second predetermined range; upon determining that the output voltage is between the first and second lower limits, controlling the switching control signal generator to generate control signals for switching the switching elements such that the switched mode power supply operates in a discontinuous conduction mode for at least one switching period of the switched mode power supply, and continues the operation in the discontinuous conduction mode until the output voltage is determined to have returned to being within the first predetermined range, whereupon the switching control signal generator is controlled to cause the switched mode power supply to resume operation in the pulse skipping mode.

23. The method according to claim 19, further comprising: after the switched mode power supply has operated in the pulse skipping mode, controlling the switching control signal generator to generate control signals for causing the switched mode power supply to resume operation in the continuous conduction mode using the locked value of the duty cycle.

24. The method according to claim 19, wherein the switched mode power supply further comprises: an error signal generator which receives a signal indicative of the output voltage of the switched mode power supply and generates an error signal based on a reference signal and the signal indicative of the output voltage; and a PID or PI regulator which generates, in dependence upon the error signal, a signal defining the duty cycle to be used by the switching control signal generator, wherein the duty cycle is locked by setting the error signal to zero when the operation of the switched mode power supply changes from the continuous conduction mode to the pulse skipping mode.

25. The method according to claim 22, wherein: upon determining that the output voltage is between the first and second lower limits during operation of the switched mode power supply in the pulse skipping mode, the switching control signal generator is controlled to generate control signals for switching the switching elements such that the switched mode power supply performs a process of operating in the discontinuous conduction mode for a single switching period of the switched mode power supply, and repeats the process until either: the output voltage falls within the first predetermined range, whereupon the switching control signal generator is controlled to cause the switched mode power supply to resume operation in the pulse skipping mode, or the current rises above the threshold or the output voltage moves outside the second predetermined range, whereupon the switching control signal generator is controlled to cause the switched mode power supply to resume operation in the continuous conduction mode.

* * * * *